US012757822B2

(12) United States Patent
Tsuchiya

(10) Patent No.: US 12,757,822 B2
(45) Date of Patent: Oct. 13, 2026

(54) CLAMP AND ELECTRIC WORKING MACHINE

(71) Applicant: MAKITA CORPORATION, Anjo (JP)

(72) Inventor: Koki Tsuchiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 356 days.

(21) Appl. No.: 18/415,866

(22) Filed: Jan. 18, 2024

(65) Prior Publication Data

US 2024/0251706 A1 Aug. 1, 2024

(30) Foreign Application Priority Data

Feb. 1, 2023 (JP) ................................ 2023-013943

(51) Int. Cl.
*A01D 34/67* (2006.01)
*A01D 34/68* (2006.01)

(52) U.S. Cl.
CPC ...... *A01D 34/67* (2013.01); *A01D 2034/6843* (2013.01)

(58) Field of Classification Search
CPC .. A01D 34/67; A01D 2034/6843; H02G 3/02; H02G 3/0468; B25F 5/02
USPC ............................................ 248/64, 72, 74.4
See application file for complete search history.

(56) References Cited

U.S. PATENT DOCUMENTS 3,711,632 A * 1/1973 Ghirardi .................. H02G 3/06 174/92
4,248,459 A * 2/1981 Pate ..................... H02G 3/0616 285/154.3
4,557,024 A * 12/1985 Roberts ................. F16L 33/035 24/23 EE
4,934,635 A * 6/1990 Sherman ............... F16L 55/035 248/74.1
5,205,520 A * 4/1993 Walker .................. F16L 3/2235 248/68.1
5,941,483 A * 8/1999 Baginski ................. F16L 3/237 248/68.1
6,595,473 B2 * 7/2003 Aoki ................... B60R 16/0215 138/108

(Continued)

FOREIGN PATENT DOCUMENTS

JP H08-290372 A 11/1996

*Primary Examiner* — Muhammad Ijaz
(74) *Attorney, Agent, or Firm* — Oliff PLC

(57) ABSTRACT

A clamp may include: a first member; and a second member configured to clamp the corrugated tube between the first and second members. The first member may include a first electrical wire fixation part and a first engagement part. The second member may include: a second electrical wire fixation part facing the first electrical wire fixation part and configured to clamp a plurality of electrical wires between the first electrical wire fixation part and the second electrical wire fixation part; and a second engagement part configured to engage with the first engagement. One of the first member and the second member may include a plurality of first ribs protruding from the one of the first member and the second member. When a corrugated tube is clamped between the first member and the second member, each of the first ribs may be disposed between adjacent protrusions of the corrugated tube.

21 Claims, 16 Drawing Sheets

(56) References Cited

U.S. PATENT DOCUMENTS

| | | | | |
|---|---|---|---|---|
| 6,668,865 | B2 * | 12/2003 | Miyamoto | B60R 16/0215 138/108 |
| 6,732,764 | B2 * | 5/2004 | Miyamoto | B60R 16/0215 138/108 |
| 6,875,918 | B2 * | 4/2005 | Sudo | H02G 3/06 138/108 |
| 7,119,275 | B2 * | 10/2006 | Suzuki | H02G 3/0691 138/108 |
| 7,581,564 | B2 * | 9/2009 | Tanaka | F16L 57/00 174/72 A |
| D702,113 | S * | 4/2014 | Weger | D8/396 |
| 9,074,715 | B2 * | 7/2015 | Weger | F16L 55/02 |
| 9,698,522 | B2 * | 7/2017 | Markefka | H02G 15/007 |
| 10,243,338 | B2 * | 3/2019 | Adachi | H02G 3/32 |
| D858,264 | S * | 9/2019 | Tenander | D8/394 |
| 10,406,999 | B2 * | 9/2019 | Ohashi | F16L 3/1075 |
| D1,004,413 | S * | 11/2023 | Honda | B60R 16/0215 D8/396 |
| 2001/0017218 | A1 * | 8/2001 | Linhart | H01R 13/005 174/82 |
| 2002/0000499 | A1 * | 1/2002 | Aoki | B60R 16/0215 248/51 |
| 2003/0102142 | A1 * | 6/2003 | Miyamoto | B60R 16/0215 439/372 |
| 2007/0128929 | A1 * | 6/2007 | Oga | F16L 3/1025 439/578 |
| 2010/0148015 | A1 * | 6/2010 | Matsuno | F16L 3/1075 248/65 |
| 2012/0312552 | A1 * | 12/2012 | Rayssiguier | E21B 17/023 166/380 |
| 2013/0102185 | A1 * | 4/2013 | Mulfinger | H01R 13/516 439/460 |
| 2013/0292940 | A1 * | 11/2013 | Richardson | F16L 33/226 285/390 |
| 2014/0151514 | A1 * | 6/2014 | Asai | F16L 3/08 248/74.1 |
| 2015/0238377 | A1 * | 8/2015 | Muhammad | F16B 2/10 248/68.1 |
| 2016/0114743 | A1 * | 4/2016 | Miyamoto | H02G 3/32 224/557 |
| 2016/0156166 | A1 * | 6/2016 | Yamamoto | H02G 3/32 174/68.3 |
| 2017/0256931 | A1 * | 9/2017 | Smith | H02G 3/0691 |
| 2017/0331263 | A1 * | 11/2017 | Matsumura | H02G 3/0437 |
| 2018/0072248 | A1 * | 3/2018 | Ohashi | F16L 3/1075 |
| 2019/0032817 | A1 * | 1/2019 | Sheppard | B60R 16/0215 |
| 2019/0091848 | A1 * | 3/2019 | Walker | B25F 5/00 |
| 2019/0363479 | A1 * | 11/2019 | Yamanashi | H01R 13/5205 |
| 2021/0291761 | A1 * | 9/2021 | Nishi | H02G 3/263 |
| 2021/0320486 | A1 * | 10/2021 | Ishimitsu | H02G 3/283 |
| 2022/0234123 | A1 * | 7/2022 | Zhou | B25F 5/021 |
| 2022/0320841 | A1 * | 10/2022 | Takagi | H02G 3/0406 |
| 2023/0120271 | A1 * | 4/2023 | Saito | H01B 7/0045 174/72 A |
| 2023/0131546 | A1 * | 4/2023 | Saito | H02G 3/32 174/72 A |
| 2023/0170681 | A1 * | 6/2023 | Saito | H02G 3/0481 174/72 A |
| 2023/0378735 | A1 * | 11/2023 | Tanaka | B60R 16/02 |
| 2024/0251706 | A1 * | 8/2024 | Tsuchiya | A01D 34/67 |
| 2025/0015579 | A1 * | 1/2025 | Lesniak | H02G 3/22 |
| 2026/0024969 | A1 * | 1/2026 | Sawairi | H02G 3/0468 |

* cited by examiner

CLAMP AND ELECTRIC WORKING MACHINE

REFERENCE TO RELATED APPLICATIONS

This application claims priority to Japanese Patent Application No. 2023-013943, filed on Feb. 1, 2023, the entire contents of which are hereby incorporated by reference into the present application.

TECHNICAL FIELD

This disclosure herewith relates to a clamp and an electric working machine.

BACKGROUND ART

Japanese Patent Application Publication No. H8-290372 describes a clamp. The clamp fixes an electrical wire to a housing.

SUMMARY

In the above clamp, a corrugated tube may be used to protect the electrical wire. In this case, it is necessary to fix the corrugated tube and the electrical wire using a tubing such as a heat-shrink tubing. In this case, the corrugated tube needs to be fixed to the housing, and the electrical wire needs to be fixed to the housing using the clamp. This increases a housing size. The disclosure herein provides art for suppressing such a housing size increase.

The present disclosure discloses a clamp. The clamp may be configured to fix a corrugated tube to a housing of an electric working machine. The corrugated tube may comprise a plurality of protrusions arranged along a longitudinal direction of the corrugated tube on an outer surface of the corrugated tube and accommodate a plurality of electrical wires inside the corrugated tube. The clamp may comprise: a first member; and a second member configured to clamp the corrugated tube between the first member and the second member. The first member may comprise a first electrical wire fixation part and a first engagement part. The second member may comprise: a second electrical wire fixation part facing the first electrical wire fixation part and configured to clamp the plurality of electrical wires between the first electrical wire fixation part and the second electrical wire fixation part; and a second engagement part configured to engage with the first engagement part. One of the first member and the second member may comprise a plurality of first ribs protruding from the one of the first member and the second member. When the corrugated tube is clamped between the first member and the second member, each of the first ribs may be disposed between adjacent protrusions of the corrugated tube.

According to the above configuration, fixation of the corrugated tube and the plurality of electrical wires can be achieved by the clamp. As a result, there is no need to provide a structure to fix the corrugated tube in the housing. Therefore, the housing can be suppressed from becoming larger.

Further, the present disclosure discloses a clamp. The clamp may be configured to fix a corrugated tube to a housing of an electric working machine. The corrugated tube may accommodate a plurality of electrical wires inside the corrugated tube. The clamp may comprise: a tube restriction part configured to restrict a movement of the corrugated tube along a longitudinal direction of the corrugated tube; and an electrical wire restriction part configured to restrict a movement of the plurality of electrical wires along the longitudinal direction.

According to the above configuration, the same effect as described above can be achieved.

Further, the present disclosure discloses an electric working machine. The electric working machine may comprise: a housing; a corrugated tube accommodating a plurality of electrical wires inside the corrugated tube; and a clamp disposed inside the housing and configured to fix the corrugated tube to the housing. The corrugated tube may comprise a plurality of protrusions arranged along a longitudinal direction of the corrugated tube on an outer surface of the corrugated tube. The clamp may comprise: a first member; and a second member configured to clamp the corrugated tube between the first member and the second member. The first member may comprise a first electrical wire fixation part and a first engagement part. The second member may comprise: a second electrical wire fixation part facing the first electrical wire fixation part and configured to clamp the plurality of electrical wires between the first electrical wire fixation part and the second electrical wire fixation part; and a second engagement part configured to engage with the first engagement part. One of the first member and the second member may comprise a plurality of first ribs protruding from the one of the first member and the second member. When the corrugated tube is clamped between the first member and the second member, each of the first ribs may be disposed between adjacent protrusions of the corrugated tube.

According to the above configuration, the same effect as described above can be achieved.

DESCRIPTION

Figure 1:
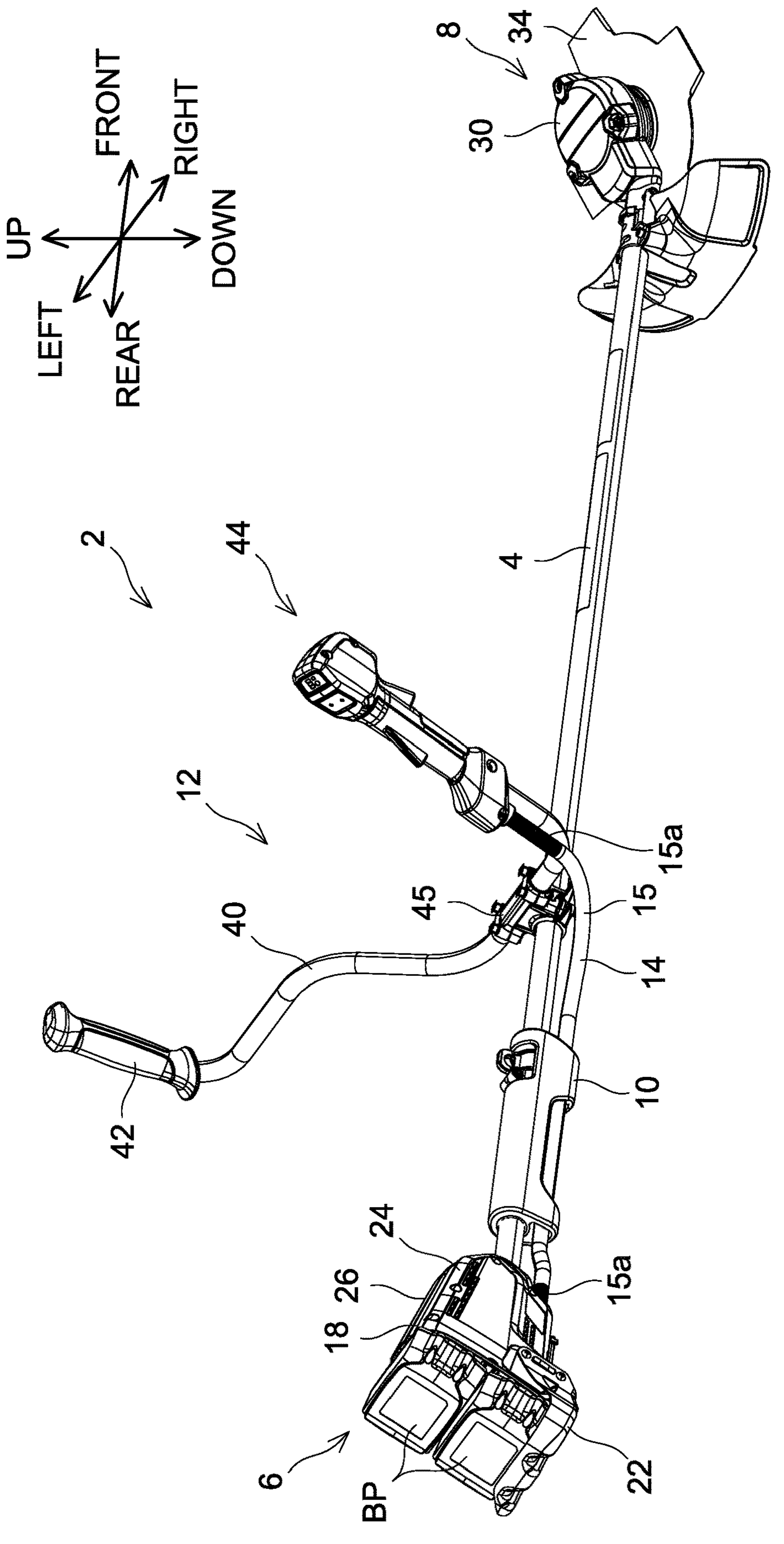
FIG. 1 is a perspective view of an electric working machine 2 of a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved clamps and electric working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A clamp may be configured to fix a corrugated tube to a housing of an electric working machine. The corrugated tube may comprise a plurality of protrusions arranged along a longitudinal direction of the corrugated tube on an outer surface of the corrugated tube and accommodate a plurality of electrical wires inside the corrugated tube. The clamp may comprise: a first member; and a second member configured to clamp the corrugated tube between the first member and the second member. The first member may comprise a first electrical wire fixation part and a first engagement part. The second member may comprise: a second electrical wire fixation part facing the first electrical wire fixation part and configured to clamp the plurality of electrical wires between the first electrical wire fixation part and the second electrical wire fixation part; and a second engagement part configured to engage with the first engagement part. One of the first member and the second member may comprise a plurality of first ribs protruding from the one of the first member and the second member. When the corrugated tube is clamped between the first member and the second member, each of the first ribs may be disposed between adjacent protrusions of the corrugated tube.

In one or more embodiments, the other of the first member and the second member may comprise a plurality of second ribs protruding from the other of the first member and the second member. When the corrugated tube is clamped between the first member and the second member, each of the second ribs may be disposed between adjacent protrusions of the corrugated tube.

According to the above configuration, the corrugated tube can further be suppressed from being unintentionally detached from the clamp.

In one or more embodiments, the corrugated tube may have a central axis extending in the longitudinal direction and extending through a center of a cross section of the corrugated tube. The first electrical wire fixation part and the second electrical wire fixation part may be disposed closer to the central axis of the corrugated tube than the plurality of the first rib.

Since the plurality of wires is accommodated in the corrugated tube, a diameter of a bundle of the plurality of wires is smaller than a diameter of the corrugated tube. According to the above configuration, the plurality of electrical wires can firmly be clamped by the first and second electrical wire fixation parts as compared to a configuration in which the first and second electrical wire fixation parts are not disposed closer to the central axis of the corrugated tube than the plurality of first ribs.

In one or more embodiments, the first electrical wire fixation part may comprise a first surface facing the second electrical wire fixation part. The first surface may have a planar shape.

According to the above configuration, the plurality of electrical wires can be clamped more firmly between the first surface and the second electrical wire fixation part.

In one or more embodiments, the first electrical wire fixation part may further comprise a first protruding rib that protrudes from the first surface. The first protruding rib may be configured to clamp the plurality of electrical wires between the second electrical wire fixation part and the first protruding rib.

According to the above configuration, the plurality of electrical wires can be clamped more firmly between the first protruding rib and the second electrical wire fixation part as compared to a configuration in which the first electrical wire fixation part does not include the first protruding rib.

In one or more embodiments, the second electrical wire fixation part may comprise a second surface facing the first surface. The second surface may have a curved shape partially covering surfaces of the plurality of electrical wires.

According to the above configuration, when the plurality of electrical wires is clamped between the first and second surfaces, the plurality of electrical wires is pressed against the first surface. Since the second surface has the curved shape that partially covers the surfaces of the plurality of electrical wires, it is possible to suppress a large force from being locally applied to the plurality of electrical wires.

In one or more embodiments, the second electrical wire fixation part may comprise a groove recessed from the second surface. The groove may face the first protruding rib.

According to the above configuration, when the plurality of electrical wires is clamped between the first protruding rib and the second surface, a part of the plurality of electrical wires enters the groove. Due to this, the plurality of electrical wires can be suppressed from slipping out from between the first protruding rib and the second surface.

In one or more embodiments, the first engagement part may be disposed adjacent to the first electrical wire fixation part. The second engagement part may be disposed adjacent to the second electrical wire fixation part.

If the first engagement part is disposed away from the first electrical wire fixation part and the second engagement part is disposed away from the second electrical wire fixation part, when a force that acts to separate the first and second members is applied to the clamp, a relative deformation between the first and second electrical wire fixation parts is likely to increase, and thus the plurality of electrical wires may unintentionally be detached from between the first electrical wire fixation part and the second electrical wire fixation part. According to the above configuration, the first engagement part is disposed adjacent to the first electrical wire fixation part and the second engagement part is disposed adjacent to the second electrical wire fixation part, thus when the force that acts to separate the first and second members is applied to the clamp, the relative deformation between the first electrical wire fixation part and the second electrical wire fixation part can be made small. Thus, the plurality of electrical wires can be suppressed from being unintentionally detaching from between the first electrical wire fixation part and the second electrical wire fixation part.

In one or more embodiments, the one of the first member and the second member may comprise a tube fixation part comprising the plurality of the first ribs. The tube fixation part may be disposed adjacent to corresponding one of the first engagement part of the first member and the second engagement part of the second member.

If the tube fixation part is disposed away from the corresponding one of the first and second engagement parts, the corrugated tube could be unintentionally detached from the plurality of first ribs due to a significant change in a position of the tube fixation part that occurs when the force that acts to separate the first and second members is applied to the clamp. According to the above configuration, since the tube fixation part is disposed adjacent to one of the first and second engagement parts, when the force that acts to separate the first and second members is applied to the clamp, the change in the position of the tube fixation part can be reduced, and the corrugated tube can be suppressed from being unintentionally detached from the plurality of first ribs.

In one or more embodiments, the first engagement part may be one of a plurality of first engagement parts. The second engagement part may be one of a plurality of second engagement parts. The first member may comprise the plurality of first engagement parts. The second member may comprise the plurality of second engagement parts.

According to the above configuration, the separation of the first and second members can further be suppressed as compared to a configuration in which a single first engagement part and a single second engagement part are engaged.

In one or more embodiments, the first electrical wire fixation part may be disposed between two of the plurality of first engagement parts. The second electrical wire fixation part may be disposed between two of the plurality of second engagement parts.

According to the above configuration, when the force that acts to separate the first and second members is applied to the clamp, the relative deformation between the first and second electrical wire fixation parts can be reduced, and the plurality of electrical wires can further be suppressed from being unintentionally detached from between the first and second electrical wire fixation parts.

In one or more embodiments, the first member may comprise the plurality of first ribs. The plurality of first ribs may be disposed between two of the plurality of first engagement parts.

According to the above configuration, when the force that acts to separate the first and second members is applied to the clamp, the change in the position of the plurality of first ribs can be reduced, and the corrugated tube can further be suppressed from being unintentionally detached from the plurality of first ribs.

In one or more embodiments, the first engagement part and the second engagement part may be configured to engage with each other by a rivet.

According to the above configuration, the first and second engagement parts can engage with each other with a simple configuration.

In one or more embodiments, the first engagement part and the second engagement part may be configured to engage with each other by a screw.

According to the above configuration, the first and second engagement parts can engage with each other with a simple configuration.

In one or more embodiments, the first engagement part may be disposed closer to the second electrical wire fixation part than an outer surface of the first electrical wire fixation part.

According to the above configuration, the rivet, the screw, and the like can be suppressed from protruding beyond the outer surface of the first electrical wire fixation part. Due to this, the clamp can be suppressed from becoming larger in size.

In one or more embodiments, the first engagement part and the second engagement part may be configured to engage with each other by a snap-fit structure.

According to the above configuration, the first and second engagement parts can be engaged with each other by a simple configuration while the number of components in the clamp is reduced.

In one or more embodiments, at least one of the plurality of electrical wires may be a signal wire.

Signal wires have a low strength as compared to power lines that carry current. For this reason, the signal wires are often used by being accommodated in a corrugated tube. According to the above configuration, even in a configuration with such low-strength signal wire(s), the corrugated tube can be fixed to the housing using the clamp while the size increase of the housing is suppressed.

In one or more embodiments, the one of the first member and the second member may comprise a tube fixation part comprising the plurality of the first ribs. In the longitudinal direction of the corrugated tube, a length of the tube fixation part may be equal to or more than 10% of a length of the clamp and equal to or less than 70% of the length of the clamp.

According to the above configuration, the plurality of electrical wires can be fixed by the first and second electrical wire fixation parts while a fixing force to fix the corrugated tube is suppressed from excessively decreasing.

An electric working machine may comprise: a housing; a corrugated tube accommodating a plurality of electrical wires inside the corrugated tube; and a clamp disposed inside the housing and configured to fix the corrugated tube to the housing. The corrugated tube may comprise a plurality of protrusions arranged along a longitudinal direction of the corrugated tube on an outer surface of the corrugated tube. The clamp may comprise: a first member; and a second member configured to clamp the corrugated tube between the first member and the second member. The first member may comprise a first electrical wire fixation part and a first engagement part. The second member may comprise: a second electrical wire fixation part facing the first electrical wire fixation part and configured to clamp the plurality of electrical wires between the first electrical wire fixation part and the second electrical wire fixation part; and a second engagement part configured to engage with the first engagement part. One of the first member and the second member may comprise a plurality of first ribs protruding from the one of the first member and the second member. When the corrugated tube is clamped between the first member and the second member, each of the first ribs may be disposed between adjacent protrusions of the corrugated tube.

In one or more embodiments, the housing may comprise: a first fixation rib extending from an inner surface of the housing; and a second fixation rib disposed away from the first fixation rib. In the longitudinal direction of the corrugated tube, the clamp may be disposed between the first fixation rib and the second fixation rib.

According to the above configuration, the clamp can be suppressed from moving in the longitudinal direction of the corrugated tube.

In one or more embodiments, the corrugated tube may have a central axis extending in the longitudinal direction and extending through a center of a cross section of the corrugated tube. The housing may comprise: a third fixation rib; and a fourth fixation rib disposed away from the third fixation rib. In a direction perpendicular to the central axis of the corrugated tube, the clamp may be disposed between the third fixation rib and the fourth fixation rib. When the clamp moves around the central axis, at least one of the third fixation rib and the fourth fixation rib may abut the clamp.

According to the above configuration, the clamp can be suppressed from moving around the central axis of the corrugated tube.

First Embodiment

As shown in FIG. 1, an electric working machine 2 of a first embodiment is a mower. The electric working machine 2 includes a pole 4, a rear end unit 6, a front end unit 8, a tube holder 10, a handle unit 12, a corrugated tube 14, and at least one battery pack BP (two in this embodiment). A user grasps the handle unit 12 with both hands to handle the electric working machine 2 to cut grass growing on the ground or on other surfaces. The pole 4 has an elongated shape. Hereafter, the longitudinal direction of the pole 4 is called a front-rear direction, a direction orthogonal to the front-rear direction is called a left-right direction, and a direction orthogonal to the front-rear direction and the left-right direction is called an up-down direction.

Figure 2:
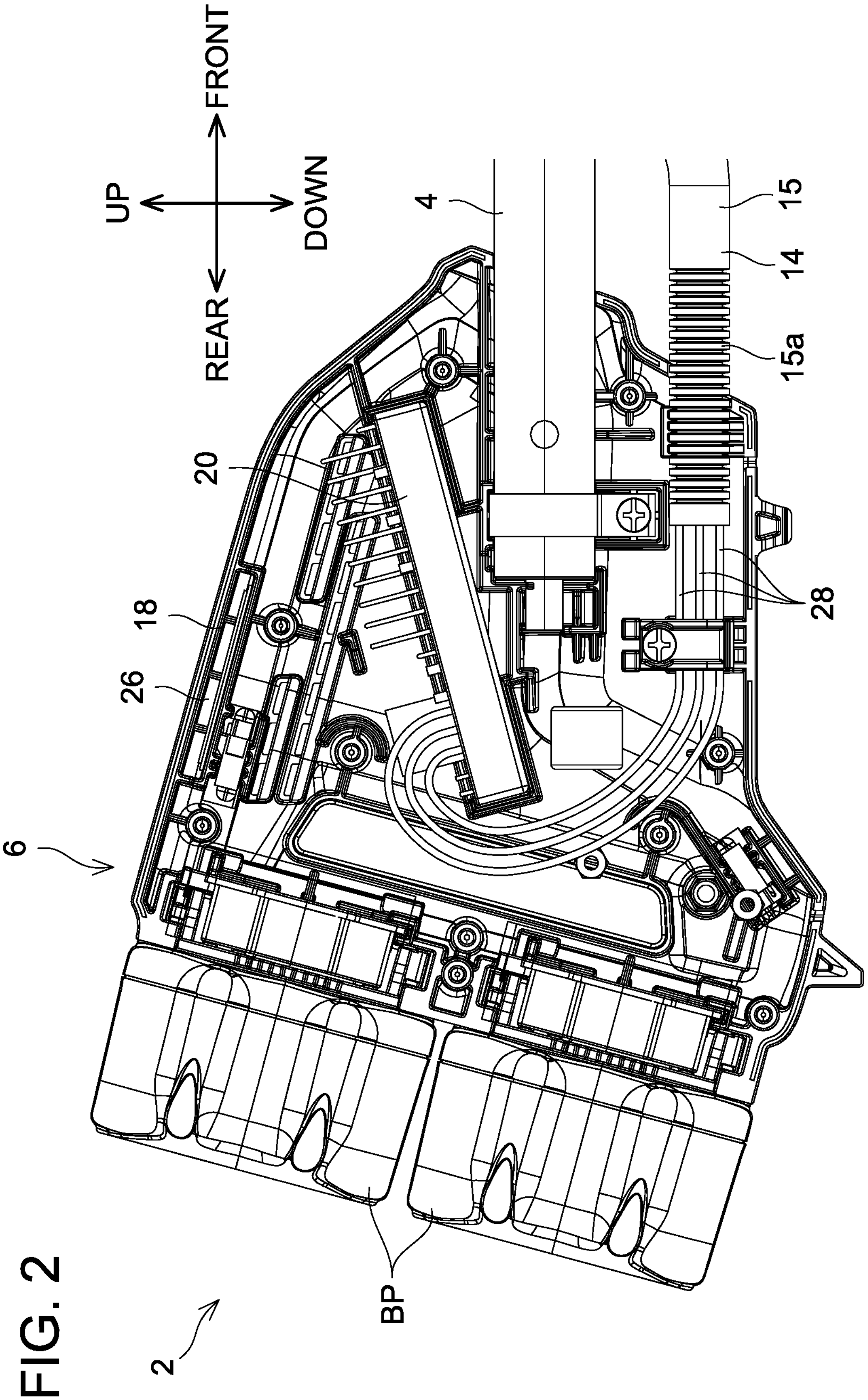
FIG. 2 is a side view of a rear end unit 6 in the electric working machine 2 of the first embodiment and its vicinity with a battery cover 22 and a rear end right housing 24 removed.

The rear end unit 6 includes a rear end housing 18, a control unit 20 (see FIG. 2), and a battery cover 22. The rear end housing 18 is fixed to the rear end of the pole 4. The rear end housing 18 includes a rear end right housing 24 that defines the outer shape of the right half of the rear end housing 18 and a rear end left housing 26 that defines the outer shape of the left half of the rear end housing 18. The two battery packs BP are removably attached to the rear surface of the rear end housing 18. The battery packs BP are, for example, lithium-ion batteries. As shown in FIG. 2, one end of the corrugated tube 14 is fixed to the vicinity of the lower front end of the rear end housing 18. The corrugated tube 14 accommodates a plurality of electrical wires 28. The rear end housing 18 houses the control unit 20 therein. The control unit 20 includes a plurality of switching elements (not shown) and a microcontroller (not shown) that switches the plurality of switching elements on and off.

As shown in FIG. 1, the battery cover 22 is attached to the lower rear end of the rear end housing 18. The battery cover 22 covers the lower end of the lower battery pack BP. This prevents the battery pack BP from abutting the ground when the electric working machine 2 is placed on the ground or the like.

The front end unit 8 includes a front end housing 30, an electric motor 32 (see FIG. 3), and a working member 34. The front end housing 30 is fixed to the front end of the pole 4. The front end housing 30 houses the electric motor 32 (see FIG. 3) therein.

Figure 3:
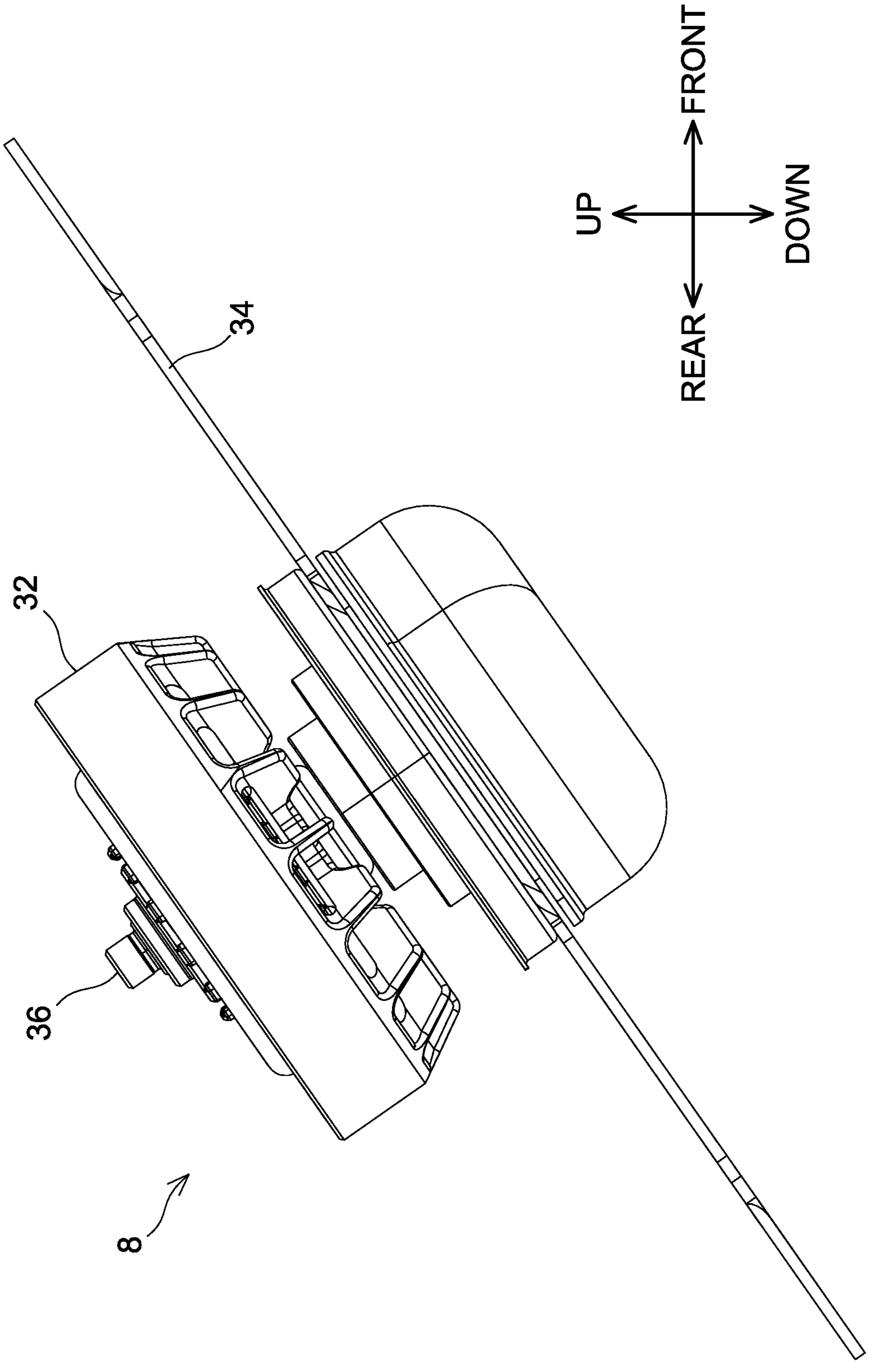
FIG. 3 is a side view of an electric motor 32 and a working member 34 of the first embodiment.

As shown in FIG. 3, the electric motor 32 is, for example, a brushless motor. The electric motor 32 is controlled by the control unit 20 (see FIG. 2) and is configured to rotate using power from the battery packs BP (see FIG. 1). A shaft 36 of the electric motor 32 is fixed to the working member 34. The working member 34 is, for example, a cutter. The working member 34 is configured to rotate integrally with the shaft 36. As a result, the working member 34 cuts the grass growing on the ground or the like.

As shown in FIG. 1, the tube holder 10 is attached to the pole 4 near the rear end unit 6. The tube holder 10 holds the corrugated tube 14 on the pole 4. This suppresses the corrugated tube 14 from slackening and being caught on the user's arm when the user operates the electric working machine 2.

The handle unit 12 is disposed between the front end unit 8 and the tube holder 10. The handle unit 12 includes a frame 40, a left grip 42, and a right grip unit 44. The frame 40 is fixed to the pole 4 via a fixing member 45. The frame 40 is substantially U-shaped.

The left grip 42 is fixed to one end of the frame 40. The left grip 42 is to be grasped by the user.

Figure 4:
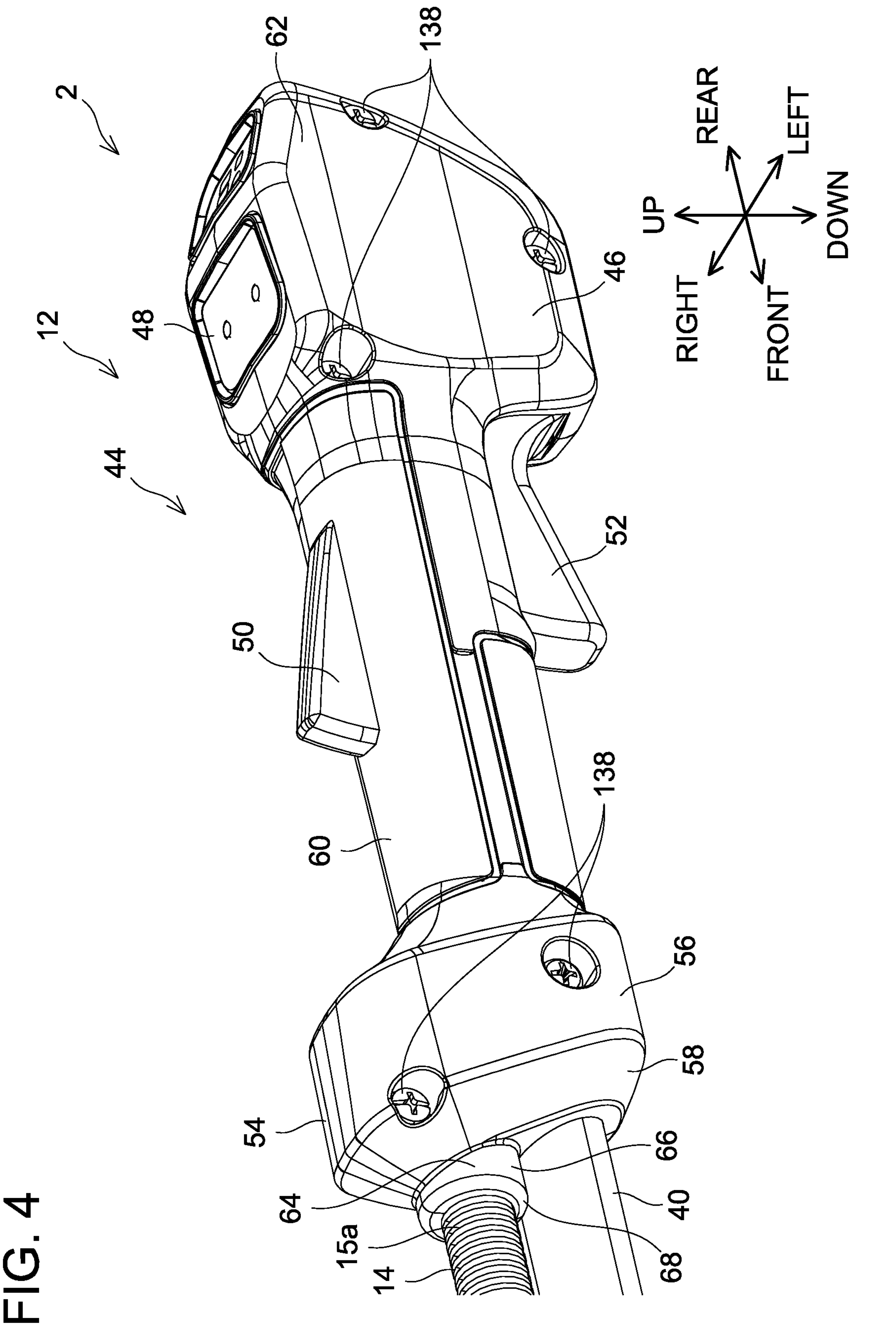
FIG. 4 is a perspective view of a right grip unit 44 in the electric working machine 2 of the first embodiment and its vicinity.

As shown in FIG. 4, the right grip unit 44 is fixed to the other end of the frame 40. The right grip unit 44 has an elongated shape. In the following description, the coordinate system is changed from the coordinate system in FIGS. 1 to 3 as described above, and the longitudinal direction of the right grip unit 44 is called the front-rear direction, the direction orthogonal to the front-rear direction is called the left-right direction, and the direction orthogonal to the front-rear and left-right directions is called the up-down direction. The right grip unit 44 includes a right grip housing 46, a main power switch 48, a shark fin 50, and a trigger 52. The right grip housing 46 is made of, for example, a plastic material. The right grip housing 46 includes a first right grip housing 54 that defines the outer shape of a half of the right grip housing 46 and a second right grip housing 56 that defines the outer shape of the other half of the right grip housing 46.

The right grip housing 46 includes a fixed part 58, a grip part 60, a head part 62, and an insertion part 64. The fixed part 58 is fixed to one end of the frame 40 at the lower front end. The grip part 60 is connected to the rear end of the fixed part 58. The grip part 60 is configured to be grasped by the user. Thus, the user can handle the electric working machine 2 by grasping the left grip 42 with the left hand and the grip part 60 with the right hand. The head part 62 is connected to the rear end of the grip part 60. The insertion part 64 is connected to the upper front end of the fixed part 58. The other end of the corrugated tube 14 is inserted into the insertion part 64.

The main power switch 48 is disposed at the head part 62. The main power switch 48 is configured to switch the electric working machine 2 on and off.

The shark fin 50 is attached to the grip part 60 in a pressable manner. The shark fin 50 is to be operated by the user with the palm. The trigger 52 is attached to the grip part 60. The trigger 52 can be pressed inward when the shark fin 50 is pressed in. The trigger 52 is to be operated by the user using the finger(s). When the trigger 52 is pressed in while the main power switch 48 is on and the shark fin 50 is pressed in, a signal is transmitted to the control unit 20 via the plurality of electrical wires 28 (see FIG. 2). The control unit 20 performs a process based on the received signal, which causes the electric motor 32 (see FIG. 3) to rotate.

Figure 5:
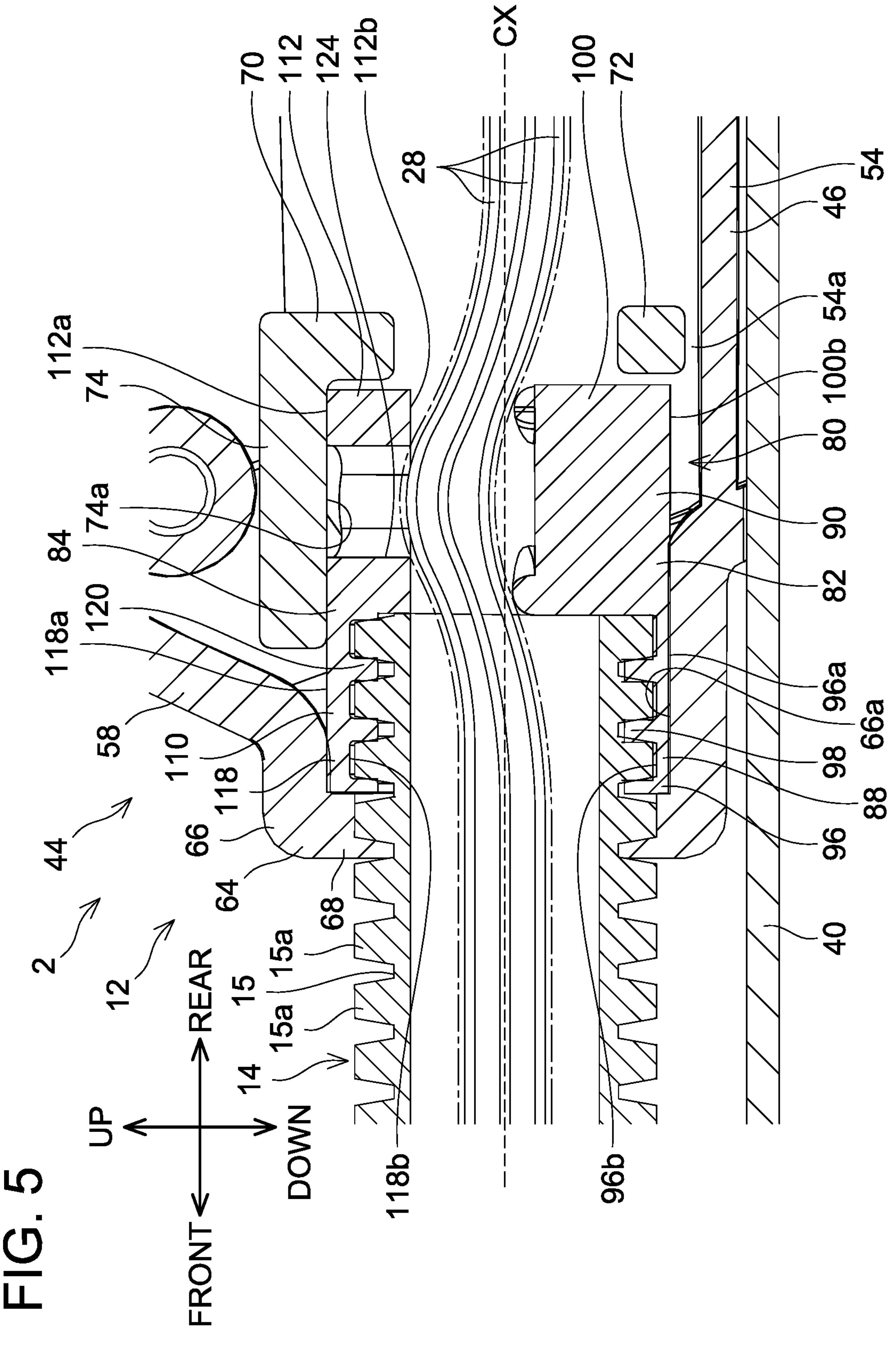
FIG. 5 is a cross-sectional view of an insertion part 64 of the right grip unit 44 in the electric working machine 2 of the first embodiment and its vicinity.

As shown in FIG. 5, the insertion part 64 includes a cylindrical rib 66 and a peripheral rib 68. As shown in FIG. 4, the cylindrical rib 66 has a substantially cylindrical shape. One end of the cylindrical rib 66 is connected to the fixed part 58. The cylindrical rib 66 is adjacent to the frame 40. As shown in FIG. 5, a portion of the inner surface of the cylindrical rib 66 has a flat surface 66*a* having a planar shape. The flat surface 66*a* is disposed at the bottom of the inner surface of the cylindrical rib 66.

The peripheral rib 68 is connected to the other end of the cylindrical rib 66. The peripheral rib 68 protrudes from the inner surface of the cylindrical rib 66 toward the central axis CX of the corrugated tube 14. The central axis CX extends in the longitudinal direction of the corrugated tube 14 and extends through the center of the cross-section of the corrugated tube 14. Further, at one end, the corrugated tube 14 comprises a plurality of protrusions 15*a* arranged along the longitudinal direction on the outer surface 15 of the corrugated tube 14. The plurality of protrusions 15*a* protrudes from the outer surface 15, and the peripheral rib 68 is in contact with the protrusions 15*a* of the corrugated tube 14.

Figure 6:
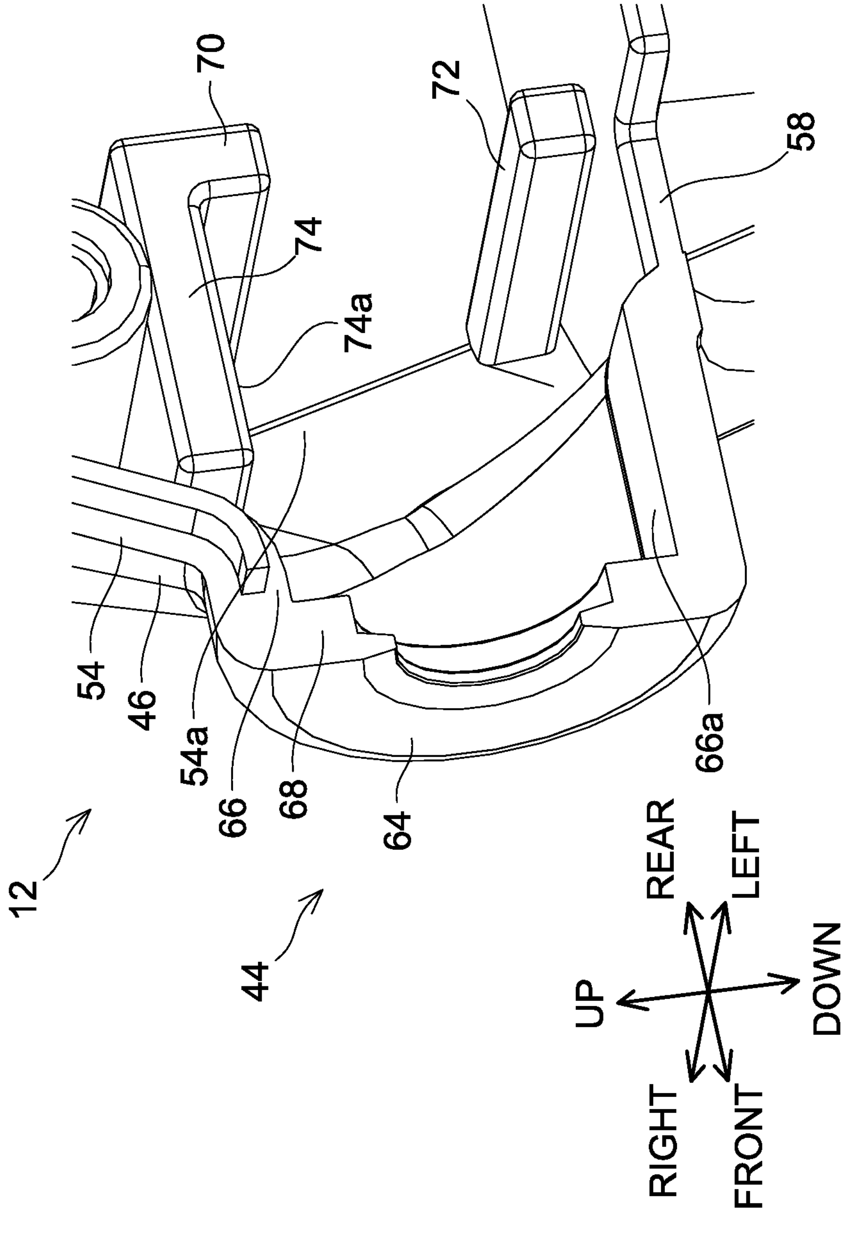
FIG. 6 is a perspective view of the insertion part 64 in a first right grip housing 54 of the first embodiment and its vicinity.

As shown in FIG. 6, the right grip housing 46 further includes a first rear fixing rib 70, a second rear fixing rib 72, and an upper fixing rib 74. The first rear fixing rib 70, the second rear fixing rib 72, and the upper fixing rib 74 are disposed in the fixed part 58. The first rear fixing rib 70, the second rear fixing rib 72, and the upper fixing rib 74 are disposed in a space defined between the first right grip housing 54 and the second right grip housing 56 (see FIG. 4).

The first rear fixing rib 70 protrudes leftward from the inner surface 54*a* of the first right grip housing 54. The inner surface 54*a* of the first right grip housing 54 defines a portion of the space between the first right grip housing 54 and the second right grip housing 56. The first rear fixing rib 70 is disposed rearward of the peripheral rib 68. The first rear fixing rib 70 is spaced apart from the peripheral rib 68.

The second rear fixing rib 72 protrudes leftward from the inner surface 54*a* of the first right grip housing 54. The second rear fixing rib 72 is disposed rearward of the peripheral rib 68. The second rear fixing rib 72 is spaced apart from the peripheral rib 68. The distance between the second rear fixing rib 72 and the peripheral rib 68 is substantially the same as the distance between the first rear fixing rib 70 and the peripheral rib 68. The second rear fixing rib 72 is disposed lower than the first rear fixing rib 70. The second rear fixing rib 72 is disposed away from the first rear fixing rib 70.

The upper fixing rib 74 protrudes leftward from the inner surface 54*a* of the first right grip housing 54. The upper fixing rib 74 is integrally formed with the first rear fixing rib 70. The upper fixing rib 74 extends forward from the upper front surface of the first rear fixing rib 70. The lower surface 74*a* of the upper fixing rib 74 has a planar shape.

Figure 7:
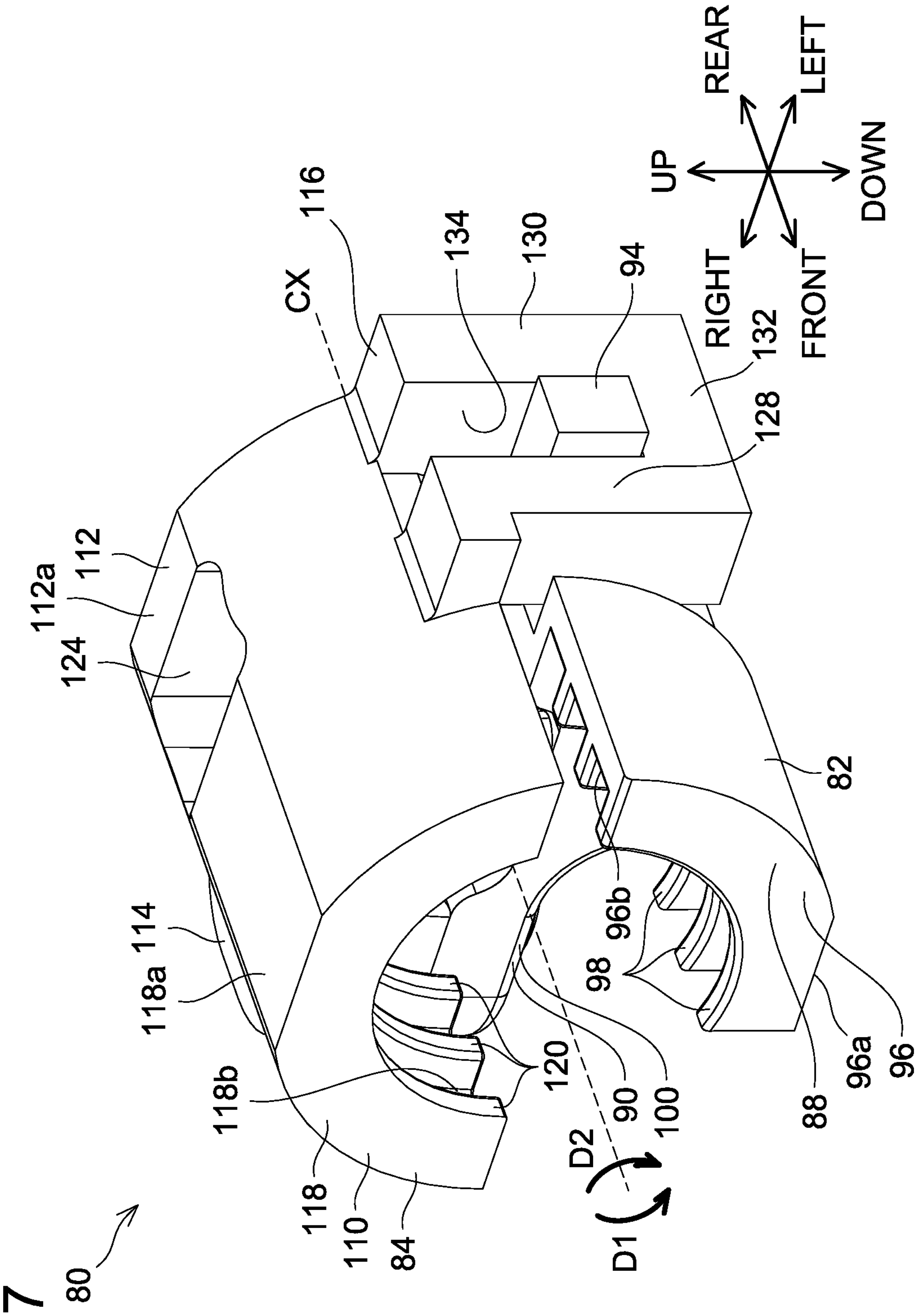
FIG. 7 is a perspective view of a clamp 80 of the first embodiment.

As shown in FIG. 5, the electric working machine 2 further comprises a clamp 80. The clamp 80 is disposed in the right grip housing 46 over the fixed part 58 and the insertion part 64. The clamp 80 clamps one end of the corrugated tube 14. As shown in FIG. 7, the clamp 80 includes a first member 82, a second member 84, and a rivet 86 (see FIG. 9). The first member 82 and the second member 84 are constituted for example of a resin material. The first member 82 and the second member 84 are, for example, a mixture of nylon and glass-reinforced fiber. The rivet 86 is, for example, made of a metallic material.

Figure 8:
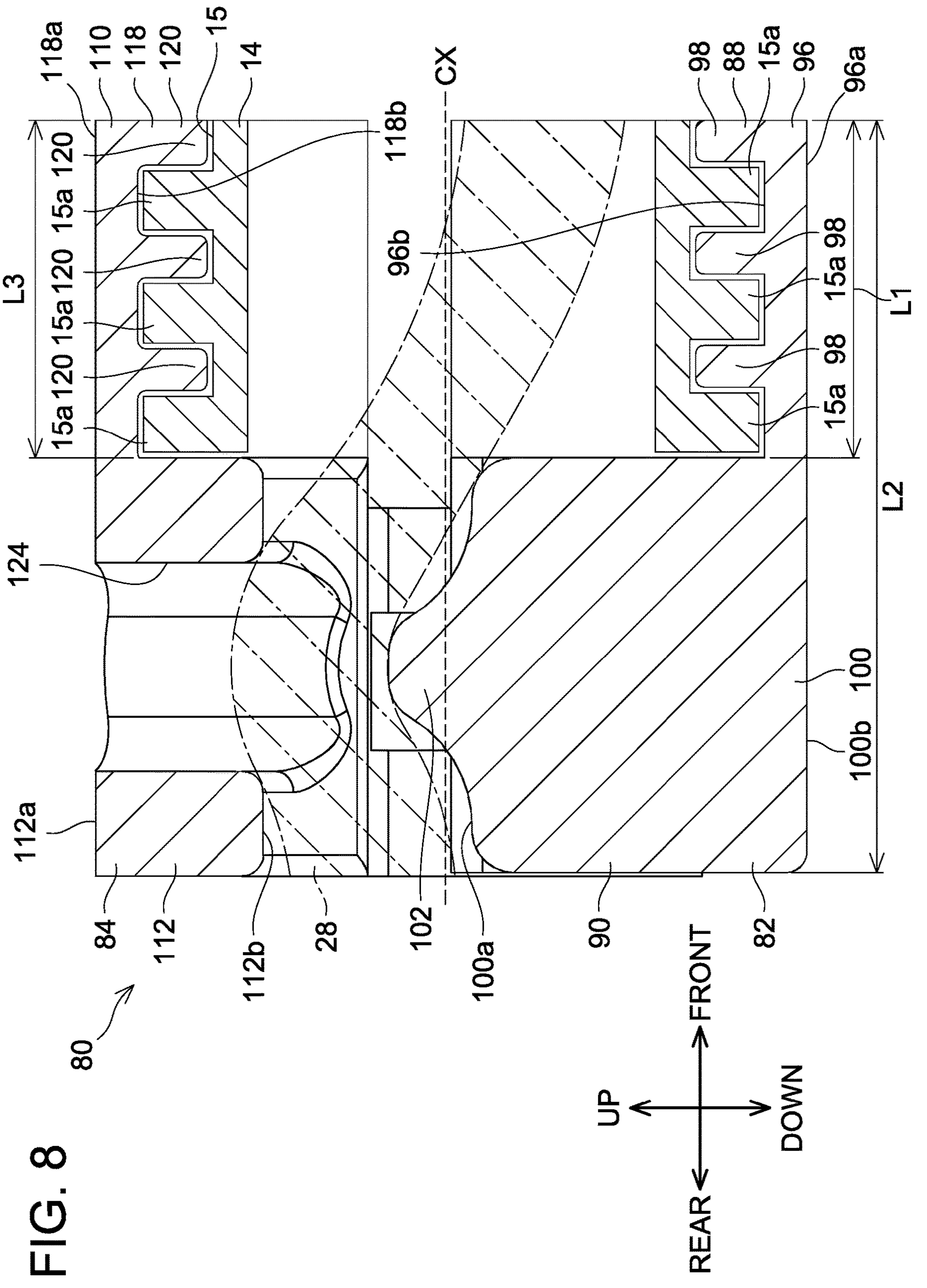
FIG. 8 is a horizontal cross-sectional view of the clamp 80 of the first embodiment.

The first member 82 includes a first tube fixation part 88, a first electrical wire fixation part 90, a first right engagement part 92 (see FIG. 9), and a first left engagement part 94. The first tube fixation part 88 includes a first tube fixing body 96 and a plurality (three in this embodiment) of first ribs 98. The first tube fixing body 96 has a split cylindrical shape corresponding to a quarter of the cylindrical shape. The lower surface 96*a* of the first tube fixing body 96 has a planar shape. The lower surface 96*a* corresponds to the lower surface of the clamp 80. As shown in FIG. 8, along the front-rear direction, a length L1 of the first tube fixing body 96 is substantially the same as a length of the first tube fixation part 88. In the front-rear direction, the length L1 is equal to or more than 10% and equal to or less than 70% of the length L2 of the clamp 80, and in this embodiment, the length L1 is equal to or more than 30% and equal to or less than 60% of the length L2. The front-rear direction is substantially the same as the longitudinal direction of the corrugated tube 14. Further, the length L2 of the clamp 80 is substantially the same as the total length of the length of the first tube fixation part 88 and the length of the first electrical wire fixation part 90. In FIG. 8, the plurality of electrical wires 28 is illustrated as a bundle of the plurality of electrical wires 28.

The plurality of first ribs 98 protrudes from the inner surface 96*b* of the first tube fixing body 96 toward the central axis CX of the corrugated tube 14. The plurality of first ribs 98 is arranged along the central axis CX. Each of the first ribs 98 is disposed between adjacent protrusions 15*a* of the corrugated tube 14.

Figure 9:
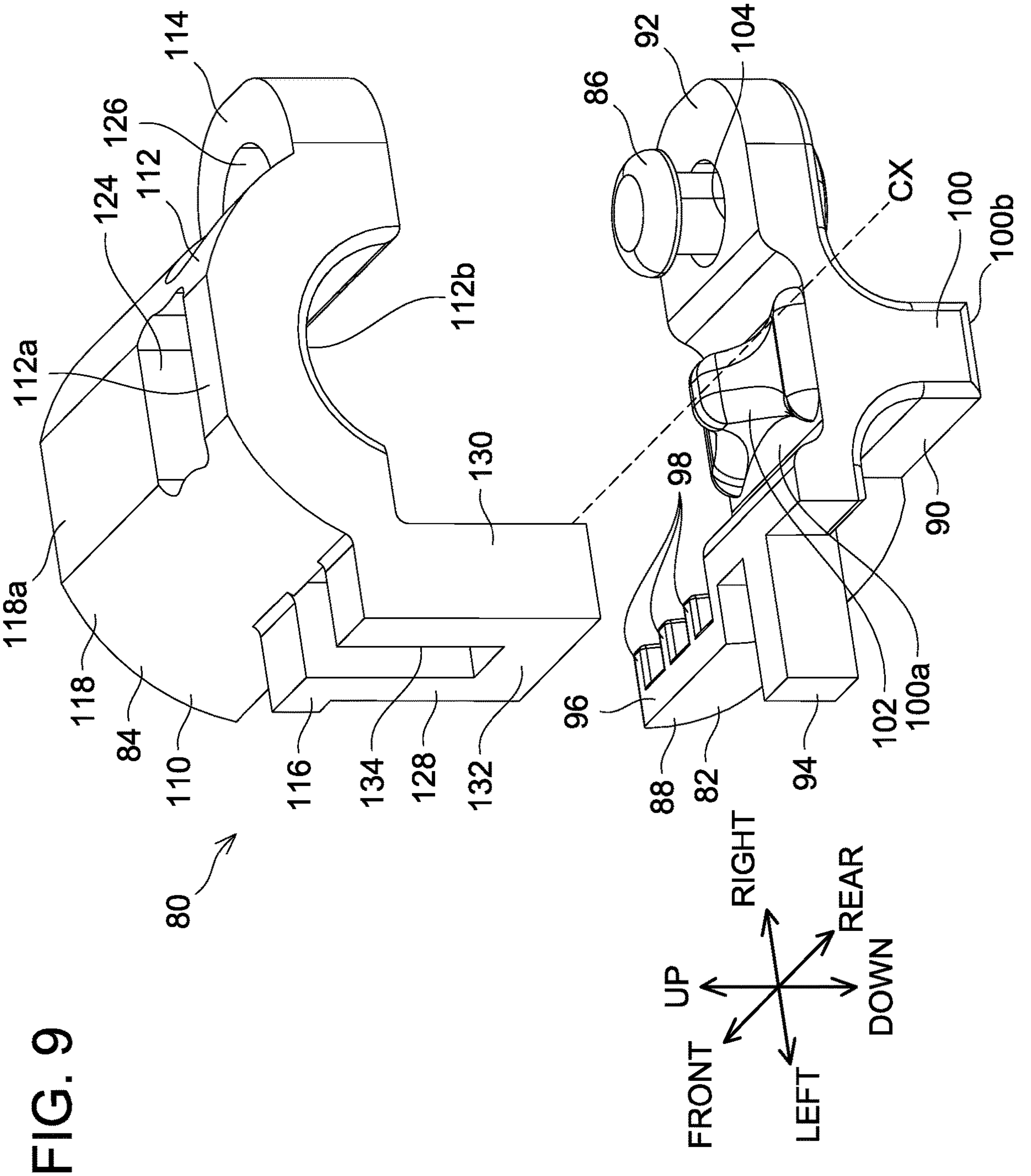
FIG. 9 is an exploded perspective view of the clamp 80 of the first embodiment.

As shown in FIG. 9, the first electrical wire fixation part 90 includes a first electrical wire fixing body 100 and a first protruding rib 102. The first electrical wire fixing body 100 is connected to the first tube fixation part 88. The first electrical wire fixing body 100 is disposed closer to the central axis CX than the plurality of first ribs 98. An upper surface 100*a* and a lower surface 100*b* of the first electrical wire fixing body 100 have a planar shape. The upper surface 100*a* is concaved downward. The lower surface 100*b* corresponds to the lower surface of the clamp 80. The first protruding rib 102 protrudes upward from the upper surface 100*a*. The first protruding rib 102 is disposed closer to the central axis CX than the upper surface 100*a*.

The first right engagement part 92 is disposed adjacent to the first electrical wire fixing body 100. The first right engagement part 92 is connected to the right end of the first electrical wire fixing body 100. The first right engagement part 92 is disposed above the lower surface 100*b* of the first electrical wire fixing body 100. The first right engagement part 92 includes a first right through hole 104 penetrating in the up-down direction. A rivet 86 is inserted into the first right through hole 104.

The first left engagement part 94 is disposed adjacent to the first electrical wire fixing body 100. The first left engagement part 94 is connected to the left end of the first electrical wire fixing body 100. The first electrical wire fixing body 100 is disposed between the first right engagement part 92 and the first left engagement part 94. The first left engagement part 94 protrudes leftward from the first electrical wire fixing body 100. The first left engagement part 94 has a substantially cuboid shape.

As shown in FIG. 7, the second member 84 includes a second tube fixation part 110, a second electrical wire fixation part 112, a second right engagement part 114, and a second left engagement part 116. The second tube fixation part 110 faces the first tube fixation part 88.

The second tube fixation part 110 includes a second tube fixing body 118 and a plurality (three in this embodiment) of second ribs 120. The second tube fixing body 118 has a split cylindrical shape corresponding to a half of the cylindrical shape. The upper surface 118*a* of the second tube fixing body 118 has a planar shape. The upper surface 118*a* corresponds to the upper surface of the clamp 80. As shown in FIG. 8, the inner surface 118*b* of the second tube fixing body 118 faces the inner surface 96*b* of the first tube fixing body 96. The second tube fixing body 118 clamps the corrugated tube 14 between the first tube fixing body 96 and the second tube fixing body 118. In the front-rear direction, a length L3 of the second tube fixing body 118 is substantially the same as a length of the second tube fixation part 110. In the front-rear direction, the length L3 is substantially the same as the length L1 of the first tube fixing body 96.

The number of the plurality of second ribs 120 is the same as the number of the plurality of first ribs 98. The plurality of second ribs 120 protrudes from the inner surface 118*b* of the second tube fixing body 118 toward the central axis CX of the corrugated tube 14. The plurality of second ribs 120 is arranged along the central axis CX. The plurality of second ribs 120 faces the plurality of first ribs 98. Each of the second ribs 120 is disposed between adjacent protrusions 15*a* of the corrugated tube 14.

Figure 10:
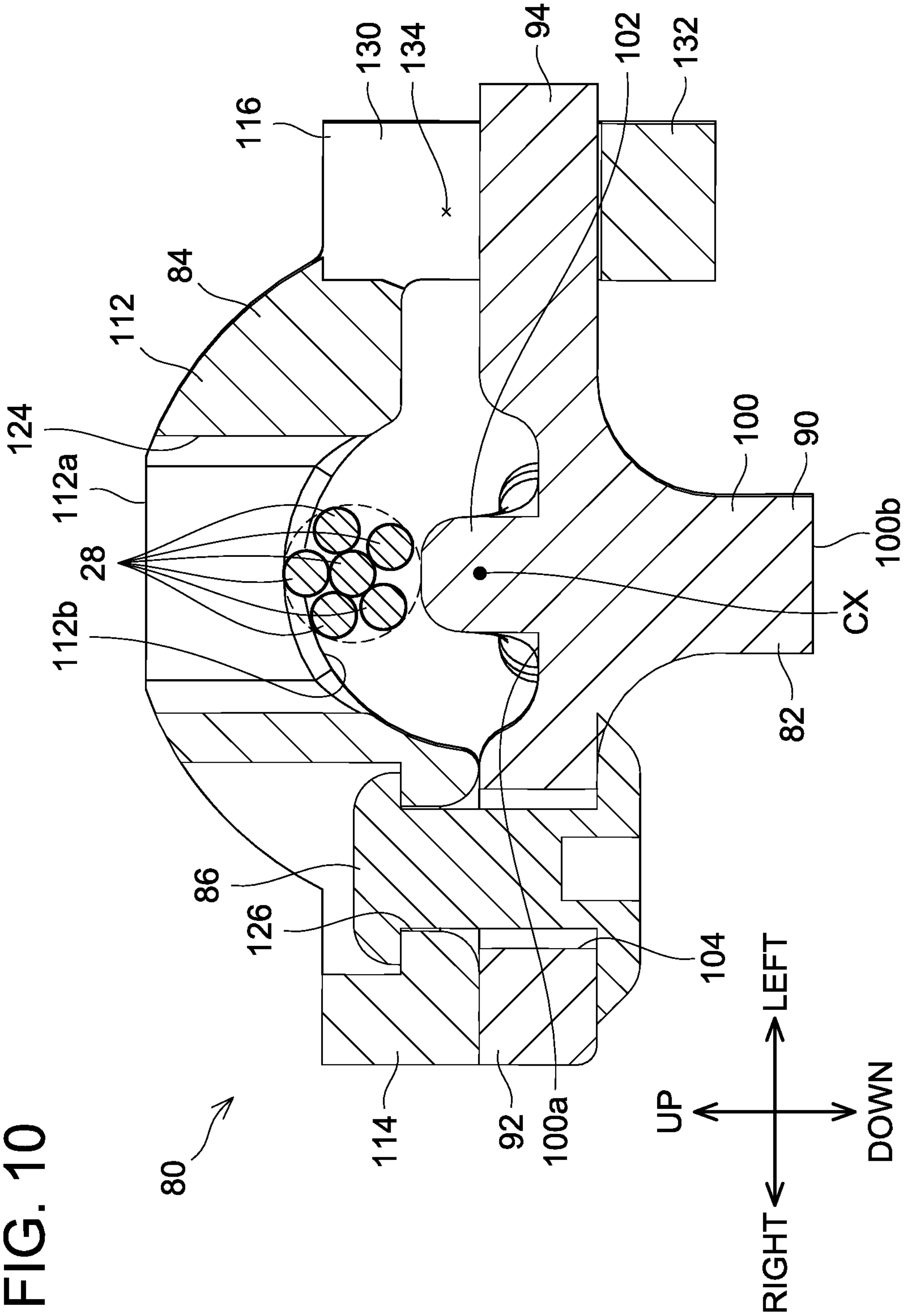
FIG. 10 is a vertical cross-sectional view of the clamp 80 of the first embodiment.

As shown in FIG. 9, the second electrical wire fixation part 112 is connected to the second tube fixing body 118. The second electrical wire fixation part 112 has a split cylindrical shape corresponding to a half of the cylindrical shape. In the front-rear direction, a length of the second electrical wire fixation part 112 is substantially the same as the length of the first electrical wire fixation part 90. The upper surface 112*a* of the second electrical wire fixation part 112 has a planar shape. As shown in FIG. 10, the inner surface 112*b* of the second electrical wire fixation part 112 has a curved shape. The inner surface 112*b* partially covers the surfaces of the plurality of electrical wires 28 accommodated in the corrugated tube 14. In FIG. 10, the bundle of the plurality of electrical wires 28 is illustrated by a dashed line. The inner surface 112*b* faces the upper surface 100*a* of the first electrical wire fixing body 100. The second electrical wire fixation part 112 clamps the plurality of electrical wires 28 between the first electrical wire fixing body 100 and the second electrical wire fixation part 112.

The second electrical wire fixation part 112 comprises a groove 124. The groove 124 is recessed from the inner surface 112*b* of the second electrical wire fixation part 112. The groove 124 extends through the second electrical wire fixation part 112 from the inner surface 112*b* to the upper surface 112*a* of the second electrical wire fixation part 112. The groove 124 faces the first protruding rib 102.

As shown in FIG. 9, the second right engagement part 114 is disposed adjacent to the second electrical wire fixation part 112. The second right engagement part 114 is connected to the right end of the second electrical wire fixation part 112. The second right engagement part 114 faces the first right engagement part 92. The second right engagement part 114 is disposed closer to the first right engagement part 92 (closer to the first electrical wire fixation part 90) than the upper surface 112*a* of the second electrical wire fixation part 112. The second right engagement part 114 has a second right through-hole 126 penetrating in the up-down direction. The second right through hole 126 faces the first right through hole 104. The rivet 86 is inserted into the second right through hole 126.

The second left engagement part 116 is disposed adjacent to the second electrical wire fixation part 112. The second left engagement part 116 is connected to the left end of the second electrical wire fixation part 112. The second electrical wire fixation part 112 is disposed between the second right engagement part 114 and the second left engagement part 116. The second left engagement part 116 has a substantially U-shape. The second left engagement part 116 includes a first wall 128 extending downward from the second electrical wire fixation part 112, a second wall 130 extending downward from the second electrical wire fixation part 112, and a third wall 132 connecting the distal end of the first wall 128 and the distal end of the second wall 130. An engagement hole 134 is defined between the first wall 128 and the second wall 130. One end of the engagement hole 134 is closed by the third wall 132.

A method of clamping one end of the corrugated tube 14 using the clamp 80 is described below. First, as shown in FIG. 8, the first tube fixation part 88 is placed on one end of the corrugated tube 14, and each first rib 98 is placed between adjacent protrusions 15*a* of the corrugated tube 14. Next, the first left engagement part 94 is inserted into the engagement hole 134 of the second left engagement part 116 shown in FIG. 9. Then, the second member 84 is brought closer to the first member 82 to bring the first right engagement part 92 and the second right engagement part 114 into contact. Due to this, as shown in FIG. 8, the corrugated tube 14 is then clamped between the inner surface 96*b* of the first tube fixation part 88 and the inner surface 118*b* of the second tube fixation part 110. Further, each second rib 120 is placed between adjacent protrusions 15*a* of the corrugated tube 14. As a result, the corrugated tube 14 is suppressed from slipping out from between the first tube fixation part 88 and the second tube fixation part 110, and the corrugated tube 14 is suppressed from moving in the front-rear direction with respect to the clamp 80. Furthermore, as shown in FIG. 10, the plurality of electrical wires 28 rides on the first protruding rib 102 and is clamped between the first protruding rib 102 and the inner surface 112*b* of the second electrical wire fixation part 112. In addition, a portion of the plurality of electrical wires 28 enters the groove 124 of the second electrical wire fixation part 112. As a result, the plurality of electrical wires 28 is suppressed from slipping out from between the first electrical wire fixation part 90 and the second electrical wire fixation part 112, and the plurality of electrical wires 28 is suppressed from moving in the front-rear direction with respect to the clamp 80. Finally, as shown in FIG. 10, after the rivet 86 is inserted into the first right through hole 104 and the second right through hole 126, one end of the rivet 86 is deformed using a tool (not shown) or the like. As a result, the first right engagement part 92 and the second right engagement part 114 engage with each other by the rivet 86, and the position of the second member 84 with respect to the first member 82 is fixed. At this time, the lower end of the rivet 86 is disposed closer to the second electrical wire fixation part 112 than the lower surface 100*b* of the first electrical wire fixation part 90, and the upper end of the rivet 86 is disposed in the second right through-hole 126. Thus, the rivet 86 does not protrude beyond the lower surface 100*b* of the first electrical wire fixation part 90 or the upper surface 112*a* of the second electrical wire fixation part 112, and the first right engagement part 92 and the second right engagement part 114 can engage with each other by the rivet 86.

Next, a method of fixing the clamp 80 clamping the corrugated tube 14 and the electrical wires 28 to the right grip housing 46 is described. First, as shown in FIG. 5, the clamp 80 is brought closer to the inner surface 54*a* of the first right grip housing 54, the first member 82 is placed between the peripheral rib 68 and the second rear fixing rib 72, and the second member 84 is placed between the peripheral rib 68 and the first rear fixing rib 70. This places the clamp 80 between the peripheral rib 68 and the second rear fixing rib 72 and between the peripheral rib 68 and the first rear fixing rib 70. As a result, the clamp 80 is suppressed from moving in the front-rear direction with respect to the right grip housing 46. When the clamp 80 is brought closer to the first right grip housing 54, the lower surface 96*a* of the first tube fixation part 88 and the lower surface 100*b* of the first electrical wire fixation part 90 are caused to face the flat surface 66*a* of the cylindrical rib 66, and the upper surface 118*a* of the second tube fixation part 110 and the upper surface 112*a* of the second electrical wire fixation part 112 are caused to face the lower surface 74*a* of the upper fixing rib 74. As a result, when the clamp 80 moves around the central axis CX of the corrugated tube 14 in the first direction D1 (see FIG. 7) or in the second direction D2 (see FIG. 7) opposite to the first direction D1, the lower surface 96*a* of the first tube fixation part 88 and the lower surface 100*b* of the first electrical wire fixation part 90 abut the flat surface 66*a* of the cylindrical rib 66, and the upper surface 118*a* of the second tube fixation part 110 and the upper surface 112*a* of the second electrical wire fixation part 112 abut the lower surface 74*a* of the upper fixing rib 74. As a result of these, the clamp 80 is suppressed from rotating around the central axis CX. Finally, as shown in FIG. 4, the second right grip housing 56 is fixed to the first right grip housing 54 using screws 138. This fixes the clamp 80 to the right grip housing 46.

(Effects)

The clamp 80 in this embodiment is configured to fix the corrugated tube 14 to the right grip housing 46 (an example of a housing) of the electric working machine 2. The corrugated tube 14 comprises the plurality of protrusions 15*a* arranged along the longitudinal direction of the corrugated tube 14 on the outer surface 15 of the corrugated tube 14 and accommodates the plurality of electrical wires 28 inside the corrugated tube 14. The clamp 80 comprises the first member 82 and the second member 84 configured to clamp the corrugated tube 14 between the first member 82 and the second member 84. The first member 82 comprises the first electrical wire fixation part 90 and the first right engagement part 92 (an example of a first engagement part). The second member 84 comprises: the second electrical wire fixation part 112 facing the first electrical wire fixation part 90 and configured to clamp the plurality of electrical wires 28 between the first electrical wire fixation part 90 and the second electrical wire fixation part 112; and the second right engagement part 114 (an example of the second engagement part) configured to engage with the first right engagement part 92. The first member 82 comprises the plurality of first ribs 98 protruding from the first member 82. When the corrugated tube 14 is clamped between the first member 82 and the second member 84, each of the first ribs 98 is disposed between adjacent protrusions 15*a* of the corrugated tube 14.

According to the above configuration, fixation of the corrugated tube 14 and the plurality of electrical wires 28 can be achieved by the clamp 80. As a result, there is no need to provide a structure to fix the corrugated tube 14 in the right grip housing 46. Therefore, the right grip housing 46 can be suppressed from becoming larger.

The clamp 80 in this embodiment is configured to fix the corrugated tube 14 to the right grip housing 46 (an example of a housing) of the electric working machine 2. The corrugated tube 14 accommodates the plurality of electrical wires 28 inside the corrugated tube 14. The clamp 80 comprises the first tube fixation part 88 and the second tube fixation part 110 (examples of a tube restriction part) configured to restrict a movement of the corrugated tube 14 along the longitudinal direction of the corrugated tube 14, and the first electrical wire fixation part 90 and the second electrical wire fixation part 112 (an example of a wire restriction part) configured to restrict a movement of the plurality of electrical wires 28 along the longitudinal direction.

According to the above configuration, the same effect as described above can be achieved.

Furthermore, the electric working machine 2 in this embodiment comprises the right grip housing 46 (an example of a housing), the corrugated tube 14 accommodating the plurality of electrical wires 28 inside the corrugated tube 14, and the clamp 80 disposed inside the right grip housing 46 and configured to fix the corrugated tube 14 to the right grip housing 46. The corrugated tube 14 comprises the plurality of protrusions 15*a* arranged along the longitudinal direction of the corrugated tube 14 on the outer surface 15 of the corrugated tube 14. The clamp 80 comprises the first member 82 and the second member 84 configured to clamp the corrugated tube 14 between the first member 82 and the second member 84. The first member 82 comprises the first electrical wire fixation part 90 and the first right engagement part 92 (an example of a first engagement part). The second member 84 comprises: the second electrical wire fixation part 112 facing the first electrical wire fixation part 90 and configured to clamp the plurality of electrical wires 28 between the first electrical wire fixation part 90 and the second electrical wire fixation part 112; and the second right engagement part 114 (an example of the second engagement part) configured to engage with the first right engagement part 92. The first member 82 comprises the plurality of first ribs 98 protruding from the first member 82. When the corrugated tube 14 is clamped between the first member 82 and the second member 84, each of the first ribs 98 is disposed between adjacent protrusions 15*a* of the corrugated tube 14.

According to the above configuration, the same effect as described above can be achieved.

The second member 84 comprises the plurality of second ribs 120 protruding from the second member 84. When the corrugated tube 14 is clamped between the first member 82 and the second member 84, each of the second ribs 120 may be disposed between adjacent protrusions 15*a* of the corrugated tube 14.

According to the above configuration, the corrugated tube 14 can further be suppressed from being unintentionally detached from the clamp 80.

Further, the corrugated tube 14 has the central axis CX extending in the longitudinal direction and extending through the center of the cross section of the corrugated tube 14. The first electrical wire fixation part 90 and the second electrical wire fixation part 112 may be disposed closer to the central axis CX of the corrugated tube 14 than the plurality of first ribs 98.

Since the plurality of electrical wires 28 is accommodated in the corrugated tube 14, the diameter of the bundle of the plurality of electrical wires 28 is smaller than the diameter of the corrugated tube 14. According to the above configuration, the plurality of electrical wires 28 can firmly be clamped by the first electrical wire fixation part 90 and the second electrical wire fixation part 112 as compared to a configuration in which the first electrical wire fixation part 90 and the second electrical wire fixation part 112 are not disposed closer to the central axis CX of the corrugated tube 14 than the plurality of first ribs 98.

The first electrical wire fixation part 90 comprises the upper surface 100*a* (an example of a first surface) facing the second electrical wire fixation part 112. The upper surface 100*a* has a planar shape.

According to the above configuration, the plurality of electrical wires 28 can be clamped more firmly between the upper surface 100*a* and the second electrical wire fixation part 112.

Further, the first electrical wire fixation part 90 further comprises the first protruding rib 102 that protrudes from the upper surface 100*a*. The first protruding rib 102 is configured to clamp the plurality of electrical wires 28 between the second electrical wire fixation part 112 and the first protruding rib 102.

According to the above configuration, the plurality of electrical wires 28 can be clamped more firmly between the first protruding rib 102 and the second electrical wire fixation part 112 as compared to the configuration where the first electrical wire fixation part 90 does not include the first protruding rib 102.

Further, the second electrical wire fixation part 112 comprises the inner surface 112*b* (an example of a second surface) facing the upper surface 100*a*. The inner surface 112*b* has a curved shape partially covering the surfaces of the plurality of electrical wires 28.

According to the above configuration, when the plurality of electrical wires 28 is clamped between the upper surface 100*a* and the inner surface 112*b*, the plurality of electrical wires 28 is pressed against the upper surface 100*a*. Since the inner surface 112*b* has a curved shape that partially covers the surfaces of the plurality of electrical wires 28, it is possible to suppress a large force from being locally applied to the plurality of electrical wires 28.

Further, the second electrical wire fixation part 112 comprises the groove 124 recessed from the inner surface 112*b*. The groove 124 faces the first protruding rib 102.

According to the above configuration, when the plurality of electrical wires 28 is clamped between the first protruding rib 102 and the inner surface 112*b*, a portion of the plurality of electrical wires 28 enters the groove 124. This suppresses the plurality of electrical wires 28 from slipping out from between the first protruding rib 102 and the inner surface 112*b*.

Further, the first right engagement part 92 is disposed adjacent to the first electrical wire fixation part 90. The second right engagement part 114 is disposed adjacent to the second electrical wire fixation part 112.

If the first right engagement part 92 is disposed away from the first electrical wire fixation part 90 and the second right engagement part 114 is disposed away from the second electrical wire fixation part 112, when a force that acts to separate the first member 82 and the second member 84 is applied to the clamp 80, the relative deformation between the first electrical wire fixation part 90 and the second electrical wire fixation part 112 is likely to increase, and thus the plurality of electrical wires 28 may thereby be unintentionally detached from between the first electrical wire fixation part 90 and the second electrical wire fixation part 112. According to the above configuration, since the first right engagement part 92 is disposed adjacent to the first electrical wire fixation part 90 and the second right engagement part 114 is disposed adjacent to the second electrical wire fixation part 112, when the force that acts to separate the first member 82 and the second member 84 is applied to the clamp 80, the relative deformation between the first electrical wire fixation part 90 and the second electrical wire fixation part 112 can be reduced, and the plurality of electrical wires 28 can be suppressed from being unintentionally detached from between the first electrical wire fixation part 90 and the second electrical wire fixation part 112.

Further, the first member 82 comprises the first right engagement part 92 and the first left engagement part 94. The second member 84 comprises the second right engagement part 114 and the second left engagement part 116.

According to the above configuration, the separation of the first member 82 and the second member 84 can further be suppressed as compared to the configuration in which a single first right engagement part 92 and a single second right engagement part 114 engage with each other.

The first electrical wire fixation part 90 is disposed between the first right engagement part 92 and the first left engagement part 94. The second electrical wire fixation part 112 is disposed between the second right engagement part 114 and the second left engagement part 116.

According to the above configuration, when the force that acts to separate the first member 82 and the second member 84 is applied to the clamp 80, the relative deformation between the first electrical wire fixation part 90 and the second electrical wire fixation part 112 can be reduced, and the plurality of electrical wires 28 can further be suppressed from being unintentionally detached from between the first electrical wire fixation part 90 and the second electrical wire fixation part 112.

The first right engagement part 92 and the second right engagement part 114 are configured to engage with each other by the rivet 86.

According to the above configuration, the first right engagement part 92 and the second right engagement part 114 can engage with each other by a simple configuration.

The first right engagement part 92 is disposed closer to the second electrical wire fixation part 112 than the upper surface 100*a* (an example of an outer surface) of the first electrical wire fixation part 90.

According to the above configuration, it is possible to suppress the rivet 86 from protruding beyond the upper surface 100*a* of the first electrical wire fixation part 90. Due to this, the clamp 80 can be suppressed from becoming larger in size.

At least one of the plurality of electrical wires 28 is a signal wire.

Signal wires have a low strength as compared to power lines that carry current. For this reason, the signal wires are often used by being accommodated in the corrugated tube 14. According to the above configuration, even in a configuration with low-strength signal wire(s), the corrugated tube 14 can be fixed to the right grip housing 46 using the clamp 80 while the size increase of the right grip housing 46 is suppressed.

Further, the first member 82 comprises the first tube fixation part 88 comprising the plurality of first ribs 98. In the longitudinal direction of the corrugated tube 14, the length L1 of the first tube fixation part 88 is equal to or more than 10% and equal to or less than 70% of the length L2 of the clamp 80.

According to the above configuration, the plurality of electrical wires 28 can be fixed by the first electrical wire fixation part 90 and the second electrical wire fixation part 112 while the fixing force to fix the corrugated tube 14 is suppressed from excessively decreasing.

The right grip housing 46 comprises the first rear fixing rib 70 (an example of a first fixing rib) extending from the inner surface 54*a* of the right grip housing 46 and the peripheral rib 68 (an example of a second fixing rib) disposed away from the first rear fixing rib 70. In the longitudinal direction of the corrugated tube 14, the clamp 80 is disposed between the first rear fixing rib 70 and the peripheral rib 68*a*.

According to the above configuration, the clamp 80 can be suppressed from moving in the longitudinal direction of the corrugated tube 14.

Further, the corrugated tube 14 has the central axis CX extending in the longitudinal direction and extending through the center of the cross section of the corrugated tube 14. The right grip housing 46 comprises the upper fixing rib 74 (an example of a third fixing rib) and the cylindrical rib 66 (an example of a fourth fixing rib) disposed away from the upper fixing rib 74. In the direction perpendicular to the central axis CX of the corrugated tube 14, the clamp 80 is disposed between the upper fixing rib 74 and the cylindrical rib 66. When the clamp 80 moves around the central axis CX in the first direction D1, the upper fixing rib 74 and the cylindrical rib 66 abut the clamp 80.

According to the above configuration, the clamp 80 can be suppressed from moving around the central axis CX of the corrugated tube 14.

Second Embodiment

Figure 11:
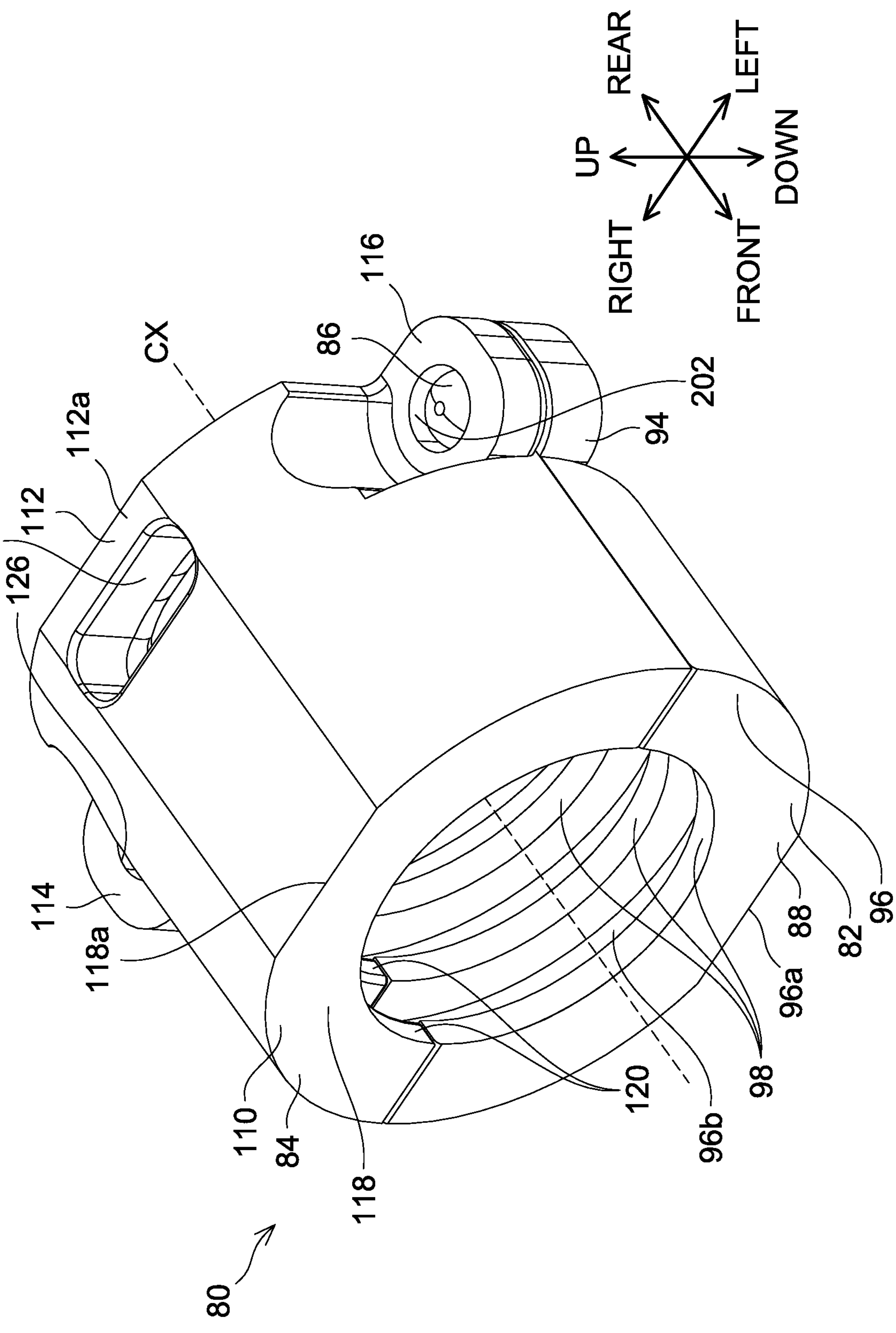
FIG. 11 is a perspective view of a clamp 80 of a second embodiment.

In the second embodiment, only the points that differ from the first embodiment will be described. As shown in FIG. 11, in the second embodiment, the first tube fixing body 96 has a split cylindrical shape corresponding to a half of the cylindrical shape.

Figure 12:
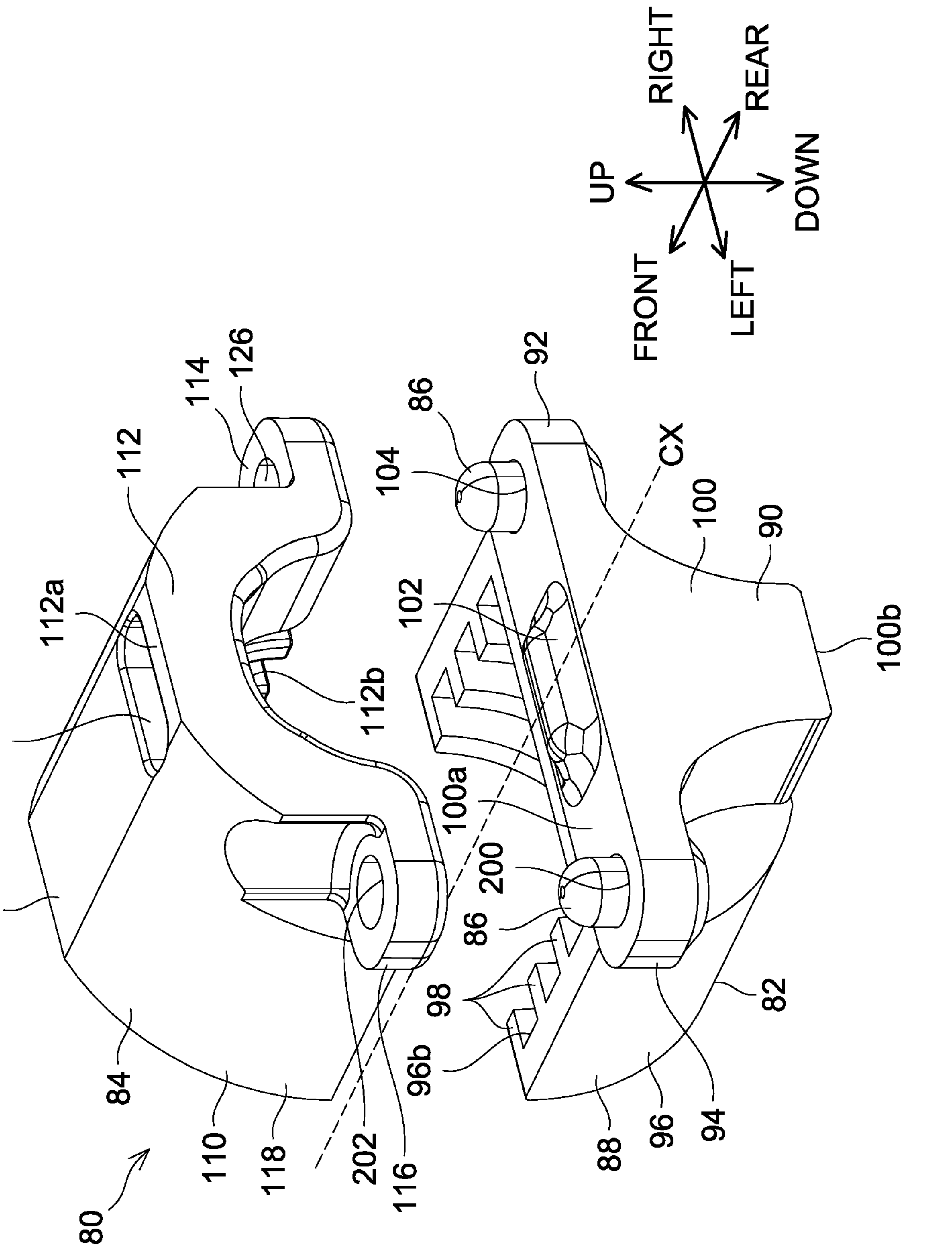
FIG. 12 is an exploded perspective view of the clamp 80 of the second embodiment.

As shown in FIG. 12, the upper surface 100*a* of the first electrical wire fixing body 100 is not concaved downward. The position of the upper surface 100*a* in the up-down direction is substantially the same as the position of the upper surface of the first right engagement part 92 in the up-down direction and the position of the upper surface of the first left engagement part 94 in the up-down direction.

The first left engagement part 94 is disposed adjacent to the first electrical wire fixing body 100. The first left engagement part 94 has a first left through-hole 200 that penetrates in the up-down direction. The second left engagement part 116 is disposed adjacent to the second electrical wire fixation part 112. The second left engagement part 116 has a second left through-hole 202 penetrating in the up-down direction. The second left through hole 202 faces the first left through hole 200. The rivet 86 is inserted into the first left through hole 200 and the second left through hole 202. The first left engagement part 94 and the second left engagement part 116 engage with each other by the rivet 86.

Third Embodiment

Figure 13:
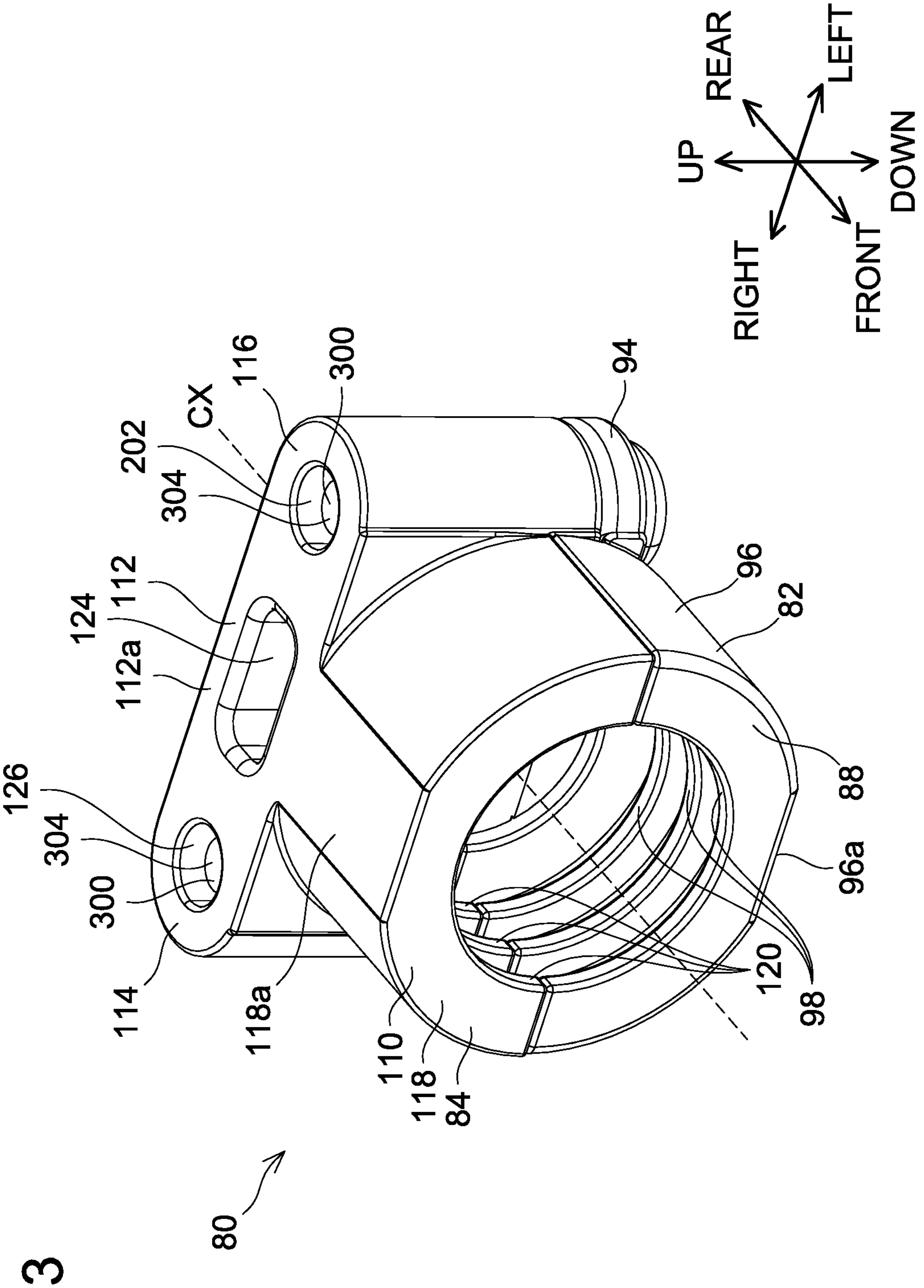
FIG. 13 is a perspective view of a clamp 80 of a third embodiment.

In the third embodiment, only the points that differ from the second embodiment will be described. As shown in FIG. 13, in the third embodiment, the second right engagement part 114 is longer in the up-down direction than the second right engagement part 114 of the second embodiment. The second left engagement part 116 is also longer in the up-down direction than the second left engagement part 116 of the second embodiment.

Figure 14:
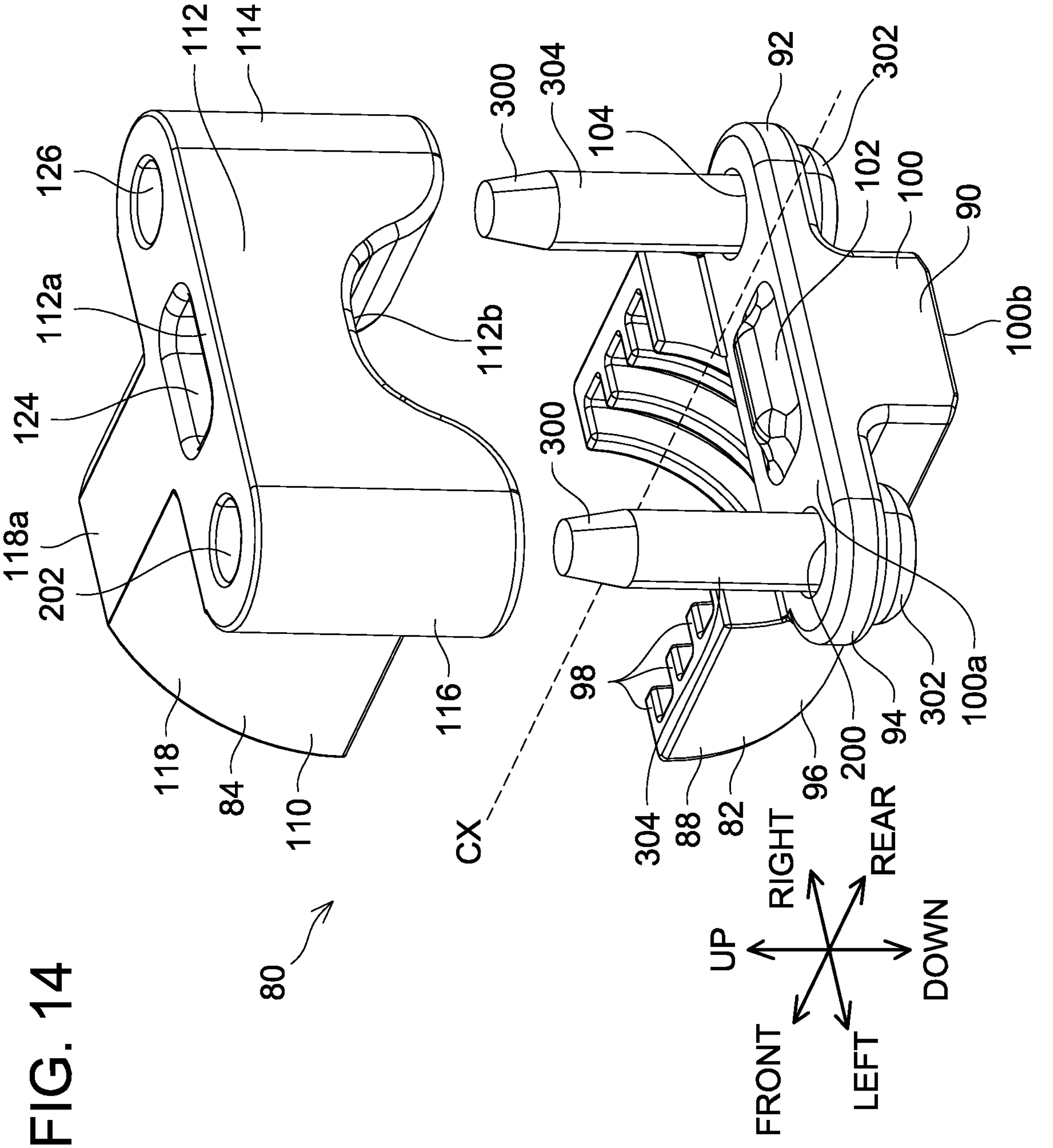
FIG. 14 is an exploded perspective view of the clamp 80 of the third embodiment.

As shown in FIG. 14, the clamp 80 comprises two screws 300 instead of the two rivets 86 of the second embodiment. One screw 300 is inserted into the first right through hole 104 and the second right through hole 126 to mesh with the second right engagement part 114. Thereby, the first right engagement part 92 and the second right engagement part 114 engage with each other by the screw 300. The other screw 300 meshes with the second left engagement part 116 by being inserted into the first left through hole 200 and the second left through hole 202. Thereby, the first left engagement part 94 and the second left engagement part 116 engage with each other by the screw 300. Head parts 302 of the two screws 300 are disposed closer to the second electrical wire fixation part 112 than the lower surface 100*b* of the first electrical wire fixation part 90. A threaded portion 304 of the one screw 300 is disposed in the second right through-hole 126, and the threaded portion 304 of the other screw 300 is disposed in the second left through-hole 202. This suppresses the screws 300 from protruding beyond the lower surface 100*b* of the first electrical wire fixation part 90 and the upper surface 112*a* of the second electrical wire fixation part 112.

(Effects)

The first right engagement part 92 and the second right engagement part 114 are configured to engage with each other by the screw 300.

According to the above configuration, the first right engagement part 92 and the second right engagement part 114 can engage with each other with a simple configuration.

Fourth Embodiment

Figure 15:
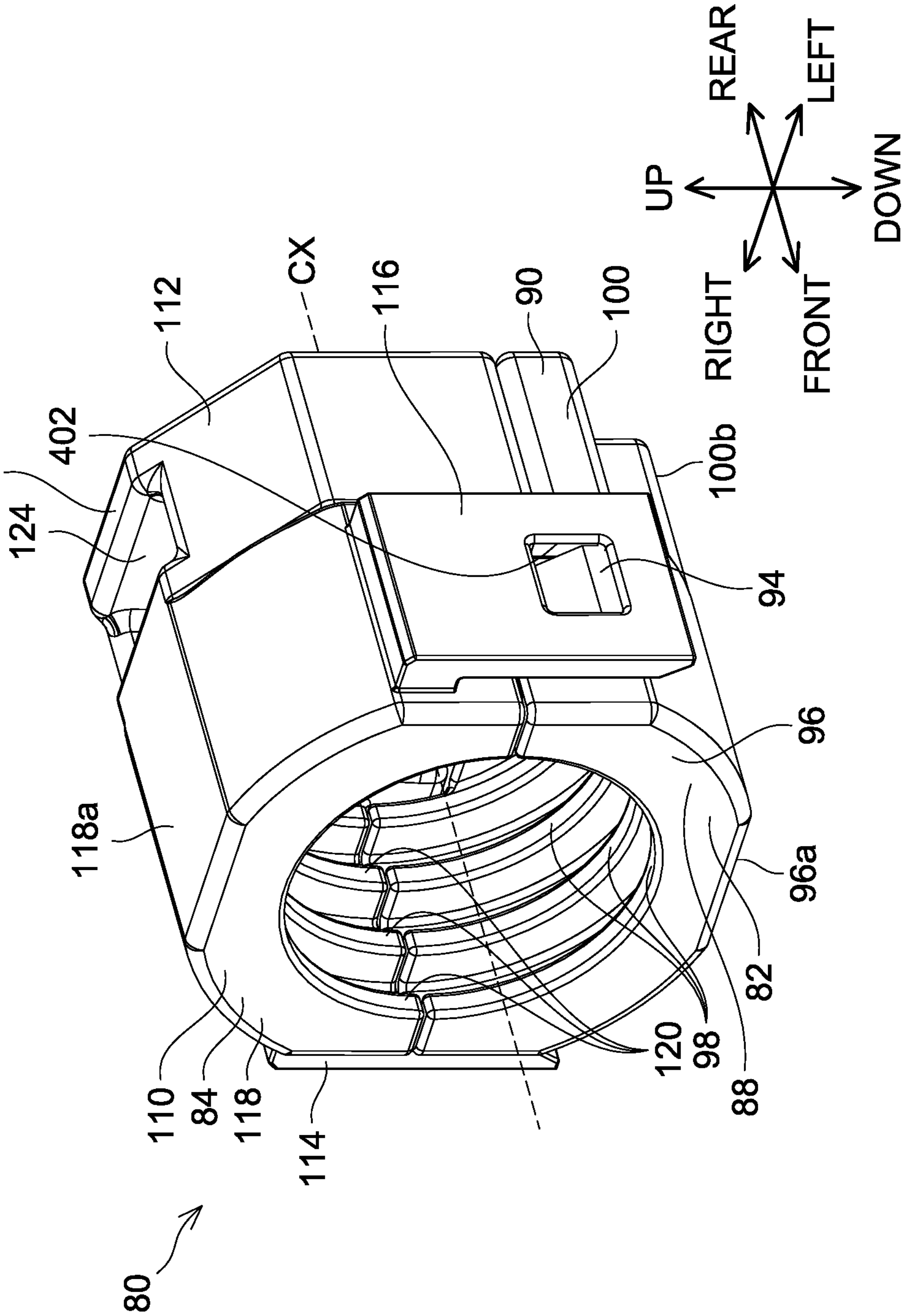
FIG. 15 is a perspective view of a clamp 80 of a fourth embodiment.

In the fourth embodiment, only the points that differ from the first embodiment will be described. As shown in FIG. 15, in the fourth embodiment, the first tube fixing body 96 has a split cylindrical shape corresponding to a half of the cylindrical shape.

Figure 16:
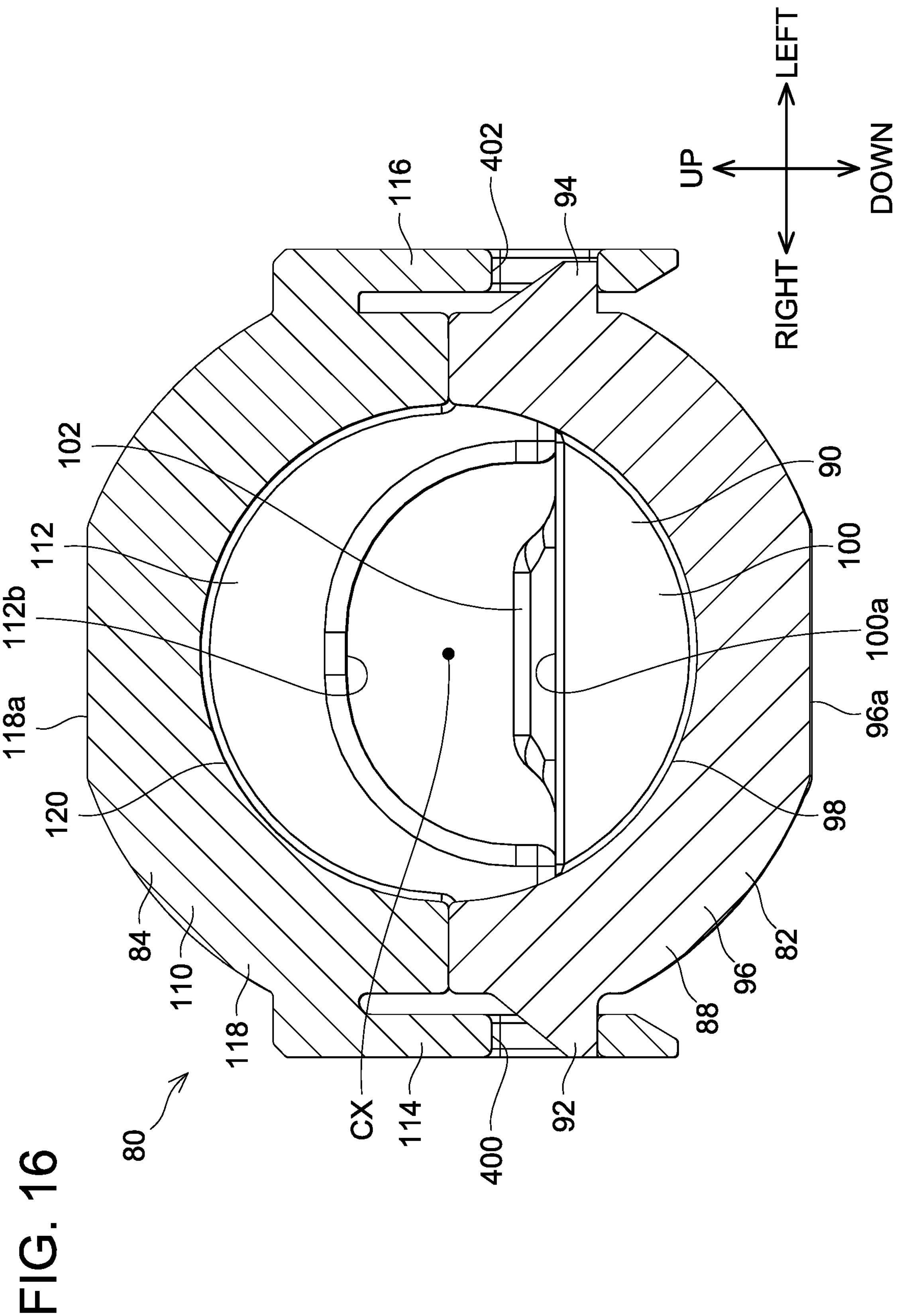
FIG. 16 is a cross-sectional view of the clamp 80 of the fourth embodiment.

As shown in FIG. 16, the first right engagement part 92 and the first left engagement part 94 are disposed adjacent to the first tube fixing body 96. The first right engagement part 92 protrudes rightward from the right end of the first tube fixing body 96. The first left engagement part 94 protrudes leftward from the left end of the first tube fixing body 96. The first tube fixing body 96 is disposed between the first right engagement part 92 and the first left engagement part 94. In the front-rear direction, the position of the first left engagement part 94 is substantially the same as the position of the first right engagement part 92.

The second right engagement part 114 and the second left engagement part 116 are disposed adjacent to the second tube fixing body 118. The second right engagement part 114 is connected to the right end of the second tube fixing body 118. The second right engagement part 114 extends rightward from the second tube fixing body 118, then bends and extends downward. The second right engagement part 114 has a second right through hole 400 that penetrates through the second right engagement part 114 in a thickness direction (left-right direction). The second right through hole 400 faces the right end of the second tube fixing body 118.

The second left engagement part 116 is connected to the left end of the second tube fixing body 118. The second left engagement part 116 extends leftward from the second tube fixing body 118, then bends and extends downward. The second left engagement part 116 has a second left through hole 402 penetrating the second left engagement part 116 in a thickness direction (left-right direction). The second left through hole 402 faces the left end of the second tube fixing body 118. In the front-rear direction, the position of the second left engagement part 116 is substantially the same as the position of the second right engagement part 114.

The method of attaching the second member 84 to the first member 82 is described below. When the second member 84 is brought closer to the first member 82, the second right engagement part 114 first abuts the first right engagement part 92, and then the second right engagement part 114 rides on the first right engagement part 92. This causes the second right engagement part 114 to elastically deform in a direction along which the distal end of the second right engagement part 114 moves away from the right end of the first tube fixing body 96. When the second right through hole 400 reaches a position facing the first right engagement part 92, the second right engagement part 114 deforms in a direction by which the distal end of the second right engagement part 114 approaches the right end of the first tube fixing body 96 due to an elastic restoring force. As a result, the first right engagement part 92 enters the second right through hole 400.

The second left engagement part 116 abuts the first left engagement part 94, and then the second left engagement part 116 rides on the first left engagement part 94. This causes the second left engagement part 116 to elastically deform in the direction along which the distal end of the second left engagement part 116 moves away from the left end of the first tube fixing body 96. When the second left through hole 402 reaches a position facing the first left engagement part 94, the second left engagement part 116 deforms in the direction along which the distal end of the second left engagement part 116 approaches the left end of the first tube fixing body 96 due to the elastic restoring force. As a result, the first left engagement part 94 enters the second left through hole 402. As a result, the second member 84 is attached to the first member 82 by the snap-fit structure by the first right engagement part 92 and the second right engagement part 114 and the snap-fit structure by the first left engagement part 94 and the second left engagement part 116.

(Effects)

The first member 82 comprises the first tube fixation part 88 (an example of a tube fixation part) comprising the plurality of first ribs 98. The first tube fixation part 88 is disposed adjacent to the first right engagement part 92 of the first member 82.

If the first tube fixation part 88 is disposed away from the first right engagement part 92, the corrugated tube 14 could unintentionally be detached from the plurality of first ribs 98 due to a significant change in a position of the first tube fixation part 88 that occurs when the force that acts to separate the first member 82 and the second member 84 is applied to the clamp 80. According to the above configuration, since the first tube fixation part 88 is disposed adjacent to the first right engagement part 92, when the force that acts to separate the first member 82 and the second member 84 is applied to the clamp 80, the change in position of the first tube fixation part 88 can be reduced and the corrugated tube 14 can be suppressed from being unintentionally detached from the plurality of first ribs 98.

The first member 82 comprises the plurality of first ribs 98. The plurality of first ribs 98 is disposed between the first right engagement part 92 and the first left engagement part 94.

According to the above configuration, when the force that acts to separate the first member 82 and the second member 84 is applied to the clamp 80, the change in position of the plurality of first ribs 98 can be reduced and the corrugated tube 14 can further be suppressed from being unintentionally detached from the plurality of first ribs 98.

Further, the first right engagement part 92 and the second right engagement part 114 are configured to engage with each other by a snap-fit structure.

According to the above configuration, the first right engagement part 92 and the second right engagement part 114 can engage with each other by a simple configuration while the number of parts in the clamp 80 is reduced.

(Variants)

The electric working machine 2 in one embodiment may be an electric working machine other than a mower, for example, a bush cutter or a lawnmower.

The electric working machine 2 in one embodiment may be an electric working machine with a built-in battery. In this case, the built-in battery is charged by connecting a power cable to an external power source.

The clamp 80 in one embodiment may only have either the first ribs 98 or the second ribs 120.

The groove 124 in one embodiment may not penetrate the second electrical wire fixation part 112 from the inner surface **112*b* to the upper surface 112*a* of the second electrical wire fixation part 112**.

The first member 82 in one embodiment may include one engagement part, or three or more engagement parts. The second member 84 may include one engagement part, or three or more engagement parts.

The plurality of electrical wires 28 in one embodiment may include ground wire(s) and/or power wire(s) that supply driving power to the electric motor 32 as well as signal wire(s).

The clamp 80 in one embodiment may abut only the flat surface **66*a* of the cylindrical rib 66 or only the lower surface 74*a* of the upper fixing rib 74** as it moves around the central axis CX.

What is claimed is:

1. A clamp configured to fix a corrugated tube to a housing of an electric working machine, the corrugated tube comprising a plurality of protrusions arranged along a longitudinal direction of the corrugated tube on an outer surface of the corrugated tube and accommodating a plurality of electrical wires inside the corrugated tube, the clamp comprising:

a first member; and a second member configured to clamp the corrugated tube between the first member and the second member, wherein the first member comprises a first electrical wire fixation part and a first engagement part, the second member comprises:

a second electrical wire fixation part facing the first electrical wire fixation part and configured to clamp the plurality of electrical wires between the first electrical wire fixation part and the second electrical wire fixation part; and a second engagement part configured to engage with the first engagement part, one of the first member and the second member comprises a plurality of first ribs protruding from the one of the first member and the second member, when the corrugated tube is clamped between the first member and the second member, each of the first ribs is disposed between adjacent protrusions of the corrugated tube, the first electrical wire fixation part comprises a first protruding rib that protrudes toward the second electrical wire fixation part, and the first protruding rib is configured to clamp the plurality of electrical wires between the second electrical wire fixation part and the first protruding rib.

2. The clamp according to claim 1, wherein the other of the first member and the second member comprises a plurality of second ribs protruding from the other of the first member and the second member, and when the corrugated tube is clamped between the first member and the second member, each of the second ribs is disposed between adjacent protrusions of the corrugated tube.

3. The clamp according to claim 1, wherein the corrugated tube has a central axis extending in the longitudinal direction and extending through a center of a cross section of the corrugated tube, and the first electrical wire fixation part and the second electrical wire fixation part are disposed closer to the central axis of the corrugated tube than the plurality of the first rib.

4. The clamp according to claim 1, wherein the first electrical wire fixation part comprises a first surface facing the second electrical wire fixation part, the first protruding rib protrudes from the first surface, and the first surface has a planar shape.

5. The clamp according to claim 4, wherein the second electrical wire fixation part comprises a second surface facing the first surface, and the second surface has a curved shape partially covering surfaces of the plurality of electrical wires.

6. The clamp according to claim 5, wherein the second electrical wire fixation part comprises a groove recessed from the second surface, and the groove faces the first protruding rib.

7. The clamp according to claim 1, wherein the first engagement part is disposed adjacent to the first electrical wire fixation part, and the second engagement part is disposed adjacent to the second electrical wire fixation part.

8. The clamp according to claim 1, wherein the one of the first member and the second member comprises a tube fixation part comprising the plurality of the first ribs, and the tube fixation part is disposed adjacent to corresponding one of the first engagement part of the first member and the second engagement part of the second member.

9. The clamp according to claim 1, wherein the first engagement part is one of a plurality of first engagement parts, the second engagement part is one of a plurality of second engagement parts, the first member comprises the plurality of first engagement parts, and the second member comprises the plurality of second engagement parts.

10. The clamp according to claim 9, wherein the first electrical wire fixation part is disposed between two of the plurality of first engagement parts, and the second electrical wire fixation part is disposed between two of the plurality of second engagement parts.

11. The clamp according to claim 9, wherein the first member comprises the plurality of first ribs, and the plurality of first ribs is disposed between two of the plurality of first engagement parts.

12. The clamp according to claim 1, wherein the first engagement part and the second engagement part are configured to engage with each other by a rivet.

13. The clamp according to claim 1, wherein the first engagement part and the second engagement part are configured to engage with each other by a screw.

14. The clamp according to claim 12, wherein the first engagement part is disposed closer to the second electrical wire fixation part than an outer surface of the first electrical wire fixation part.

15. The clamp according to claim 1, wherein the first engagement part and the second engagement part are configured to engage with each other by a snap-fit structure.

16. The clamp according to claim 1, wherein at least one of the plurality of electrical wires is a signal wire.

17. The clamp according to claim 1, wherein the one of the first member and the second member comprises a tube fixation part comprising the plurality of the first ribs, and in the longitudinal direction of the corrugated tube, a length of the tube fixation part is equal to or more than 10% of a length of the clamp and equal to or less than 70% of the length of the clamp.

18. A clamp configured to fix a corrugated tube to a housing of an electric working machine, the corrugated tube accommodating a plurality of electrical wires inside the corrugated tube, the clamp comprising:

a tube restriction part configured to restrict a movement of the corrugated tube along a longitudinal direction of the corrugated tube; and an electrical wire restriction part configured to restrict a movement of the plurality of electrical wires along the longitudinal direction, wherein:

the electrical wire restriction part comprises:

a first electrical wire fixation part; and a second electrical wire fixation part facing the first electrical wire fixation part and configured to clamp the plurality of electrical wires between the first electrical wire fixation part and the second electrical wire fixation part, the first electrical wire fixation part comprises a first protruding rib that protrudes toward the second electrical wire fixation part, and the first protruding rib is configured to clamp the plurality of electrical wires between the second electrical wire fixation part and the first protruding rib.

19. An electric working machine comprising:

a housing;

a corrugated tube accommodating a plurality of electrical wires inside the corrugated tube; and a clamp disposed inside the housing and configured to fix the corrugated tube to the housing, wherein the corrugated tube comprises a plurality of protrusions arranged along a longitudinal direction of the corrugated tube on an outer surface of the corrugated tube, the clamp comprises:

a first member; and a second member configured to clamp the corrugated tube between the first member and the second member, the first member comprises a first electrical wire fixation part and a first engagement part, the second member comprises:

a second electrical wire fixation part facing the first electrical wire fixation part and configured to clamp the plurality of electrical wires between the first electrical wire fixation part and the second electrical wire fixation part; and a second engagement part configured to engage with the first engagement part, one of the first member and the second member comprises a plurality of first ribs protruding from the one of the first member and the second member, and when the corrugated tube is clamped between the first member and the second member, each of the first ribs is disposed between adjacent protrusions of the corrugated tube.

20. The electric working machine according to claim 19, wherein the housing comprises:

a first fixation rib extending from an inner surface of the housing; and a second fixation rib disposed away from the first fixation rib, and in the longitudinal direction of the corrugated tube, the clamp is disposed between the first fixation rib and the second fixation rib.

21. The electric working machine according to claim 19, wherein the corrugated tube has a central axis extending in the longitudinal direction and extending through a center of a cross section of the corrugated tube, and the housing comprises:

a third fixation rib; and a fourth fixation rib disposed away from the third fixation rib, in a direction perpendicular to the central axis of the corrugated tube, the clamp is disposed between the third fixation rib and the fourth fixation rib, and when the clamp moves around the central axis, at least one of the third fixation rib and the fourth fixation rib abuts the clamp.

* * * * *